United States Patent
Maeno

(10) Patent No.: US 10,698,416 B2
(45) Date of Patent: Jun. 30, 2020

(54) AUTONOMOUS MOBILE APPARATUS AND AUTONOMOUS MOVE METHOD

(71) Applicant: CASIO COMPUTER CO., LTD., Tokyo (JP)

(72) Inventor: Yasushi Maeno, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 176 days.

(21) Appl. No.: 16/026,168

(22) Filed: Jul. 3, 2018

(65) Prior Publication Data

US 2019/0011929 A1  Jan. 10, 2019

(30) Foreign Application Priority Data

Jul. 5, 2017 (JP) ................... 2017-131894

(51) Int. Cl.
*G05D 1/02* (2020.01)
*G05D 1/00* (2006.01)

(52) U.S. Cl.
CPC ......... *G05D 1/0274* (2013.01); *G05D 1/0016* (2013.01); *G05D 1/0022* (2013.01); *G05D 1/0088* (2013.01); *G05D 1/0219* (2013.01); *G05D 1/0225* (2013.01); *G05D 1/0242* (2013.01); *G05D 1/0246* (2013.01); *G05D 1/0248* (2013.01); *G05D 2201/0215* (2013.01)

(58) Field of Classification Search
CPC .. G05D 1/0274; G05D 1/0016; G05D 1/0022; G05D 1/0088; G05D 1/0219; G05D 1/0225; G05D 1/0242; G05D 1/0246; G05D 1/0248; G05D 2201/0215
See application file for complete search history.

(56) References Cited

U.S. PATENT DOCUMENTS

2017/0178331 A1* 6/2017 Narikawa ............ G05D 1/0246

FOREIGN PATENT DOCUMENTS

JP       2016-052515 A     4/2016

* cited by examiner

*Primary Examiner* — Aaron L Troost
(74) *Attorney, Agent, or Firm* — Scully Scott Murphy & Presser

(57) ABSTRACT

An autonomous mobile apparatus includes a driving unit, a memory including a map memory, and a processor. The processor is configured to estimate an apparatus location based on information from the driving unit and estimate the apparatus location based on information from other than the driving unit. The processor is configured to acquire a location of an object around the autonomous mobile apparatus, create an environment map based on the estimated apparatus location and the acquired object location, and store the environment map in the map memory. The processor is configured to use, at a time of tracking when the estimation of the apparatus location based on the information from other than the driving unit is enabled, the environment map that is in the map memory at a time of reference determined by a time of loss when the estimation of the apparatus location is not enabled.

20 Claims, 16 Drawing Sheets

EXEMPLARY SCAN BY RANGE SENSOR

EXEMPLARY DISTANCE DATA

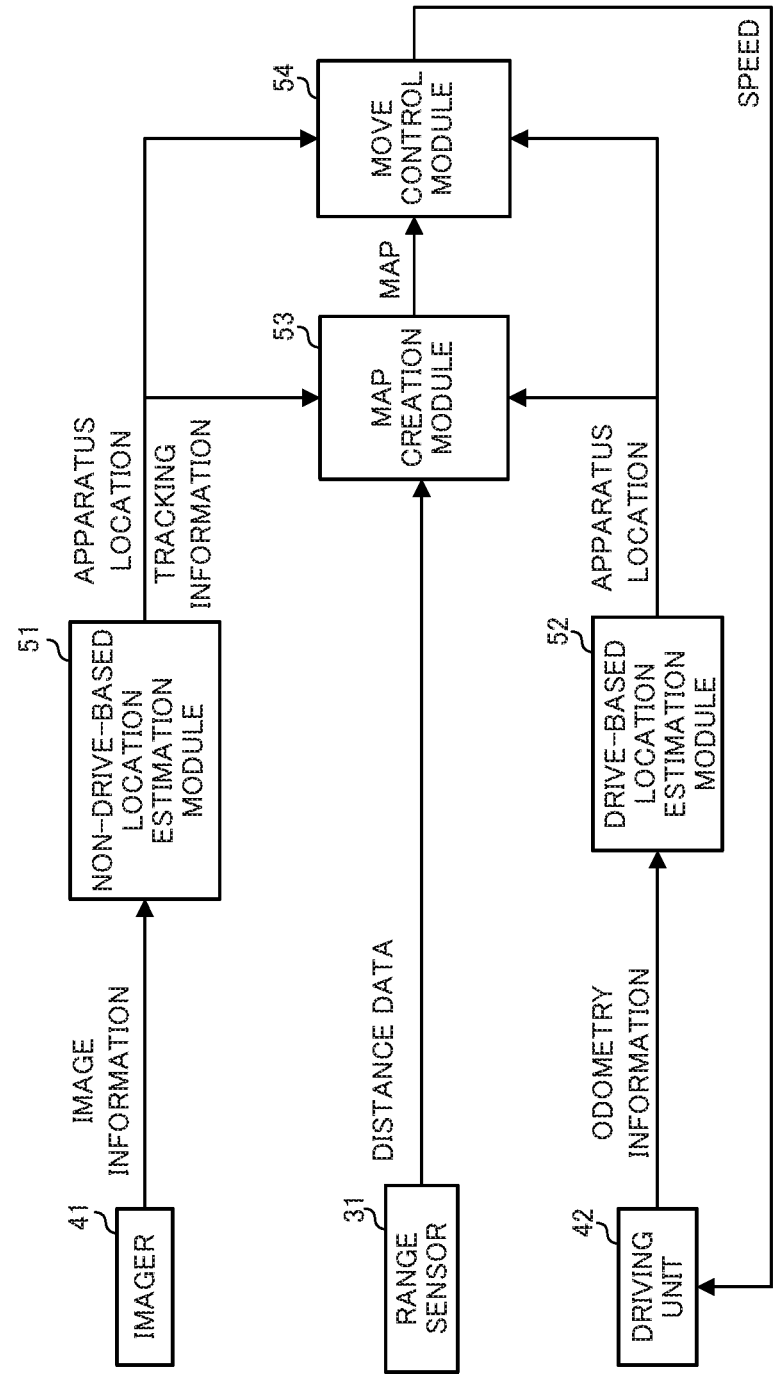

AUTONOMOUS MOBILE APPARATUS AND AUTONOMOUS MOVE METHOD

CROSS-REFERENCE TO RELATED APPLICATION

This application claims the benefit of Japanese Patent Application No. 2017-131894, filed on Jul. 5, 2017, the entire disclosure of which is incorporated by reference herein.

FIELD

This application relates generally to an autonomous mobile apparatus, and an autonomous move method.

BACKGROUND

Autonomous mobile apparatuses that autonomously move according to the purpose of use have become widespread. For example, autonomous mobile apparatuses that autonomously move for indoor cleaning are known. Generally, such autonomous mobile apparatuses need to create a map of a real space and estimate their own apparatus location in the real space.

For example, the simultaneous localization and mapping (SLAM) is known as a method of creating a map of a real space. In the SLAM, the apparatus location (three-dimensional location of the autonomous mobile apparatus) and the three-dimensional locations of feature points are alternately estimated by tracking the same feature points in multiple frames of a video image that is captured by a camera. For example, Unexamined Japanese Patent Application Kokai Publication No. 2016-52515 discloses a mobile robot that can move while creating a map of the surrounding area using the SLAM.

SUMMARY

An autonomous mobile apparatus according to one aspect of the present disclosure includes a driving unit configured to move the autonomous mobile apparatus, a memory including a map memory, and a processor. The processor is configured to estimate, based on information from the driving unit, an apparatus location that is a location of the autonomous mobile apparatus, estimate the apparatus location based on information from other than the driving unit, and acquire an object location that is a location of an object that is present in a surrounding area of the autonomous mobile apparatus. The processor is also configured to create an environment map that includes the object location based on the apparatus location estimated based on the information from the driving unit or the information from other than the driving unit and the acquired object location, and store the created environment map in the map memory. The processor is also configured to use, at a time of tracking when the estimation of the apparatus location based on the information from other than the driving unit is enabled, the stored environment map that is in the map memory at a time of reference that is determined by a time of loss when the estimation of the apparatus location based on the information from other than the driving unit is not enabled.

BRIEF DESCRIPTION OF THE DRAWINGS

A more complete understanding of this application can be obtained in consideration of the following detailed description in conjunction with the following drawings, in which:

FIG. 4 is a diagram that shows the entire configuration of software modules of the autonomous mobile apparatus according to Embodiment 1;

DETAILED DESCRIPTION

An autonomous mobile apparatus, and an autonomous move method according to embodiments of the present disclosure will be described below with reference to the drawings. In the figures, the same or corresponding parts are referred to by the same reference numbers.

Embodiment 1

The autonomous mobile apparatus according to embodiments of the present disclosure is an apparatus that autonomously moves according to the purpose of use while creating a map of the surrounding area. The purpose of use includes, for example, use for security monitoring, for indoor cleaning, for pets, for toys, and the like.

Figure 1:
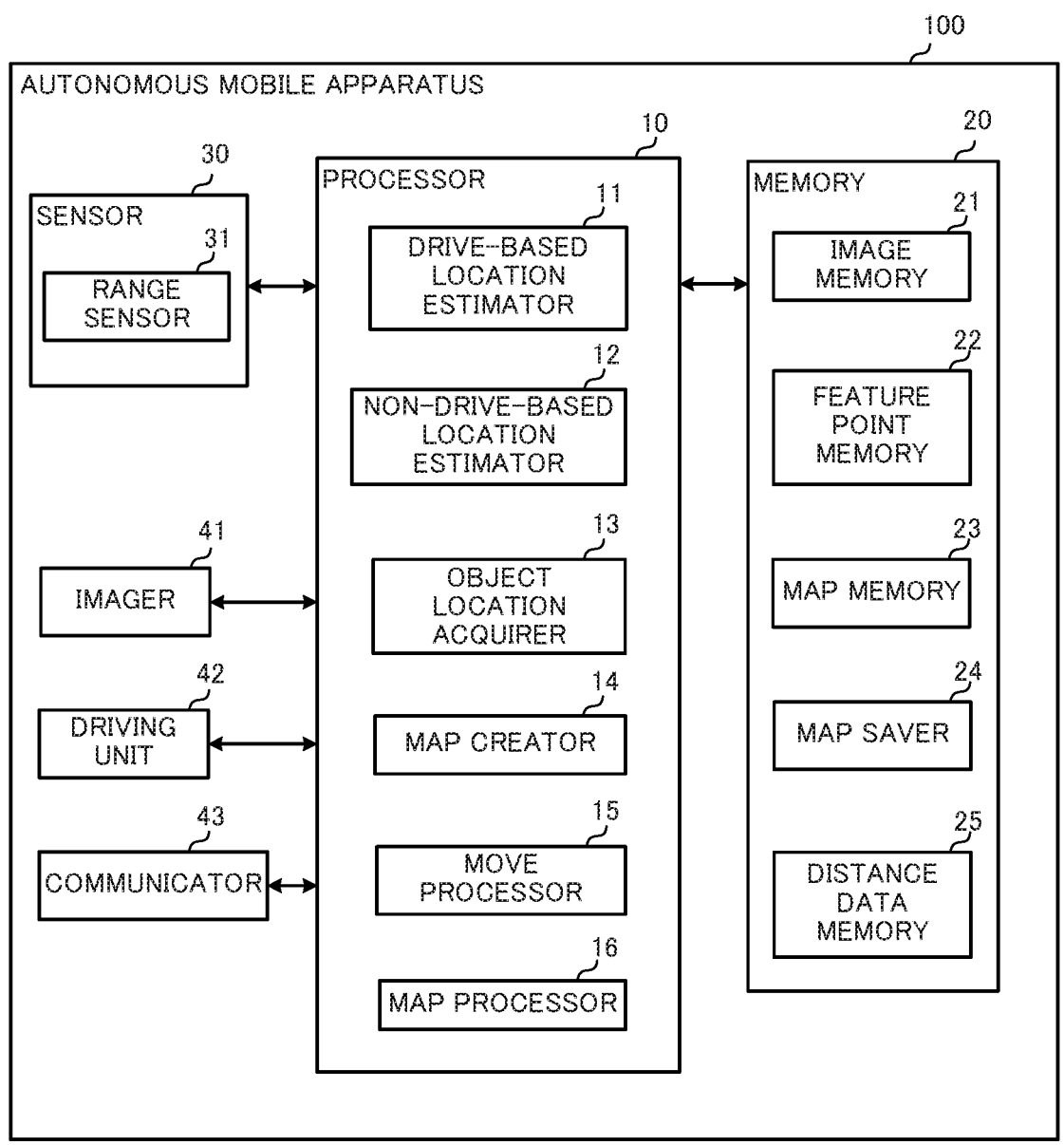
FIG. 1 is a diagram that shows a functional configuration of an autonomous mobile apparatus according to Embodiment 1 of the present disclosure.

As shown in FIG. 1, an autonomous mobile apparatus 100 according to Embodiment 1 of the present disclosure includes a processor 10, a memory 20, a sensor 30, an imager 41, a driving unit 42, and a communicator 43.

The processor 10 includes a central processing unit (CPU) and the like, and executes programs that are stored in the memory 20 to realize the functions of parts described later (a drive-based location estimator 11, a non-drive-based location estimator 12, an object location acquirer 13, a map creator 14, a move processor 15, and a map processor 16). Moreover, the processor 10 includes a timer (not shown), and thus can measure the elapsed time.

The memory 20 includes a read only memory (ROM), a random access memory (RAM), and the like, and functionally includes an image memory 21, a feature point memory 22, a map memory 23, a map saver 24, and a distance data memory 25. The ROM stores programs that are executed by the CPU of the processor 10 and data that are necessary in advance for execution of the program. The RAM stores data that are created and/or changed while the programs are executed.

The image memory 21 stores images that are captured by the imager 41. However, not all captured images need to be stored for saving the memory capacity. The autonomous mobile apparatus 100 estimates its own location (apparatus location and orientation) by the SLAM processing using multiple images that are stored in the image memory 21. In regard to the images that are used in estimating its own location, information of those images and information of its own location at the time of capturing of those images are acquired.

For a feature point with the three-dimensional location (X, Y, Z) in a real space obtained among feature points that are included in the images stored in the image memory 21, the three-dimensional location and a feature quantity of the feature point are associated with each other and stored in the feature point memory 22. The feature points are characteristic parts in an image such as corner parts and the like in an image. The feature points can be acquired using an algorithm such as the scale-invariant feature transform (SIFT) or the speeded up robust features (SURF). Moreover, the feature quantity of a feature point is a quantity obtained by, for example, the SIFT or the like. In the above-mentioned SLAM processing, the apparatus location is estimated based on the three-dimensional locations of the feature points that are stored in the feature point memory 22. Therefore, the feature point memory 22 can be considered to store map information for the SLAM processing.

The map memory 23 stores an environment map that is created by the map creator 14 based on information from the sensor 30. The environment map is an occupancy grid map based on a floor on which the autonomous mobile apparatus 100 moves. The occupancy grid map is a map generated by dividing the floor into a grid of, for example, 5 cm×5 cm cells, and represents, as a value of each grid point, a presence probability of an obstacle at a location corresponding to each grid point (in a region having the same shape as the cell and having the center at each grid point). Here, "a location corresponding to each cell (cell region)" may be used instead of "a location corresponding to each grid point". Here, the value of a grid point on the gridded map is higher as the possibility of presence of an obstacle there is higher and lower as the possibility of absence of an obstacle there is higher, and for that reason, is termed "the presence probability" for convenience. It does not need to be a precise presence probability. The numeric values of the presence probability that are recorded as the values of the grid points on the gridded map may be the values of the presence probability P (real numbers between 0 and 1) themselves; however, logarithmic odds L (integers) are used in this embodiment. The relationship between P and L is expressed by the expression (1) below in which k is a positive constant.

$$P = 1 - 1/(1+\exp(kL)) \quad (1).$$

As understood from the expression (1), L=0 when P=0.5, L=−∞ when P=0, and L=∞ when P=1. Using the logarithmic odds, the probability can be treated in integers. Then, whether an obstacle is present at a location corresponding to a grid point can be presented by whether the value L at the grid point is higher or lower than a reference value. In this embodiment, it is assumed that the value L has a minimum value (Lmin) of −127 and a maximum value (Lmax) of 127, and the initial values of the grid points on the gridded map are set to L=0. Then, for example, an obstacle is present at the grid point when L is higher than a reference presence value (for example, 10), no obstacle is present at the grid point when L is lower than a reference absence value (for example, −10), and whether an obstacle is present/absent is unknown when L is equal to or higher than the reference absence value and lower than the reference presence value. These values can be changed on an arbitrary basis, though.

The map saver 24 is a memory region for the map processor 16 to save information of the environment map that is stored in the map memory 23.

The distance data memory 25 stores distance data that present the distance to an object that is detected by the range sensor 31 that is described later along with information of the angle at which the object is detected.

Figure 2:
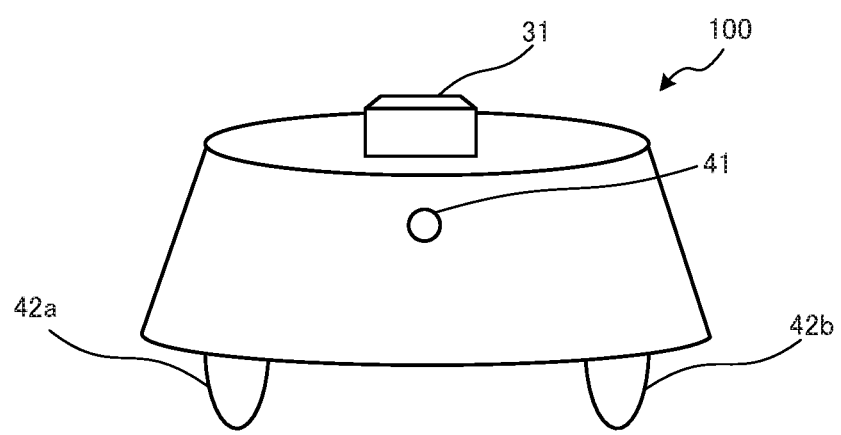
FIG. 2 is an illustration that shows an appearance of the autonomous mobile apparatus according to Embodiment 1.
Figure 3A:
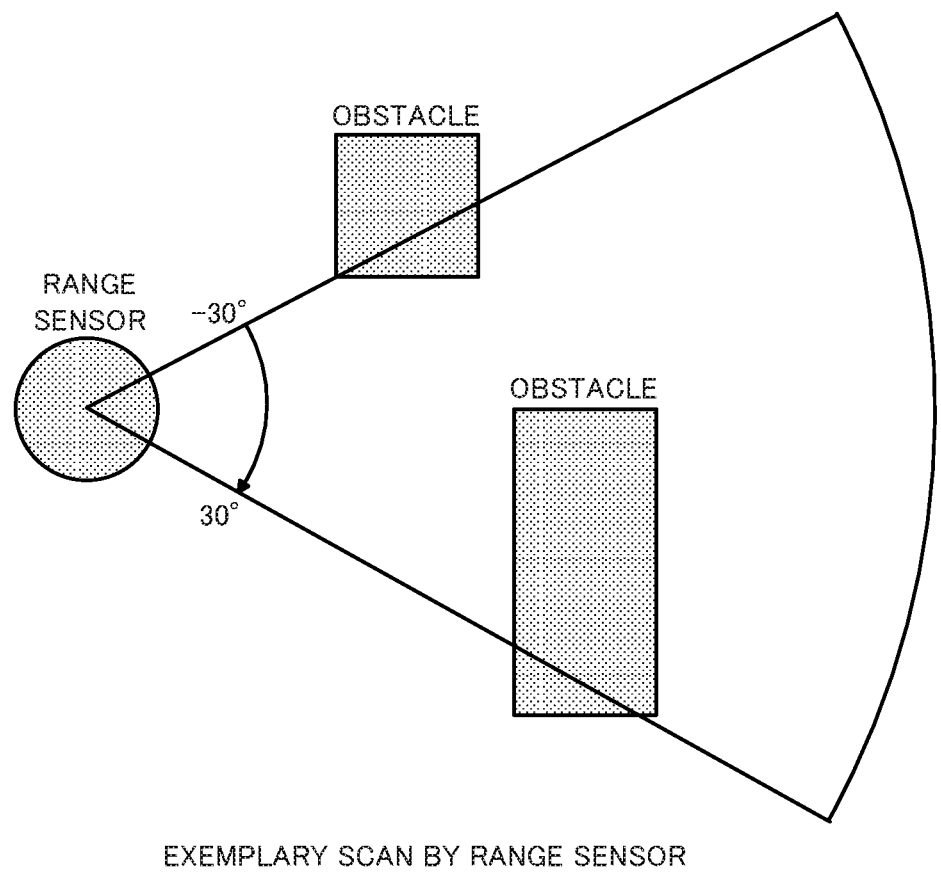
FIG. 3A is an illustration that shows exemplary scanning by a range sensor.
Figure 3B:
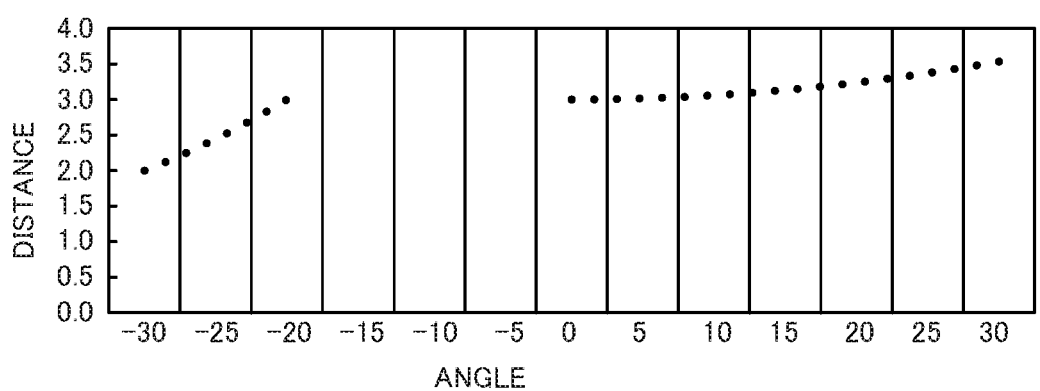
FIG. 3B is a chart that shows exemplary distance data that are obtained by the range sensor.

The sensor 30 includes a sensor that detects an object that is present around the autonomous mobile apparatus 100. In Embodiment 1, the sensor 30 includes a range sensor 31 that detects an object that is present in the surrounding area and acquires the distance to the object (distance data). The range sensor 31 includes, for example, a two-dimensional laser scanner that is provided at the top of the autonomous mobile apparatus 100 as shown in FIG. 2. Scanning within a given angular range (for example, a range from −30 degrees to +30 degrees) with laser light as shown in FIG. 3, the range sensor 31 can acquire the distance to an object that is present in the surrounding area within the given angular range (distance data) at each given angle (for example, one degree). If there is no obstacle in a direction, there are no distance data for that angle. For example, when the range sensor 31 scans as shown in FIG. 3A, distance data shown in FIG. 3B are acquired. The range sensor 31 observes (scans) the surrounding area periodically (for example, at a frequency of 30 times per second) and when detecting an object, transmits to the processor 10 distance data that present the distance to the object and information of the angle at which the object is detected. Then, the processor 10 registers the information (the distance to an object and the angle at which the object is detected) in the distance data memory 25.

The imager 41 includes a monocular imaging device (camera) as shown in FIG. 2. The imager 41 acquires images (frames) at 30 frames per second (fps). The autonomous mobile apparatus 100 autonomously moves while recognizing the apparatus location and the surrounding environment in real time by the SLAM processing based on the images that are successively acquired by the imager 41.

The driving unit 42 is moving means of an independent two-wheel drive type that includes wheels and motors. In FIG. 2, the right wheel is shown as a driving unit 42a and the left wheel is shown as a driving unit 42b. The autonomous mobile apparatus 100 can parallel-shift (translation) back and forth by driving the two wheels in the same direction, rotate (turn) on the spot by driving the two wheels in opposite directions, and circle (translation+rotation (turn)) by driving the two wheels at different speeds. Moreover, each wheel is provided with a rotary encoder. The amount of translation and the amount of rotation can be calculated by measuring the numbers of rotations of the wheels with the rotary encoders and using geometric relationships of the diameter of the wheels, the distance between the wheels, and the like.

For example, assuming that the diameter of the wheels is D and the number of rotations is R (that is measured by the rotary encoders), the amount of translation at the ground contact parts of the wheels is π·D·R. Moreover, assuming that the diameter of the wheels is D, the distance between the wheels is I, the number of rotations of the right wheel is RR, and the number of rotations of the left wheel is RL, the amount of rotation for turning (assuming that the right turn is positive) is 360°×D×(RL−RR)/(2×I). Successively adding the amount of translation and the amount of rotation above, the driving unit 42 functions as so-called odometry and can be used to estimate the apparatus location (apparatus location and orientation with reference to the apparatus location and orientation at the start of moving. Here, "the orientation" of the device is also referred to as "the posture" of the apparatus.

However, the apparatus location and orientation that are obtained from the odometry are often less accurate because of worn-out wheels, slipping wheels, or the like. Particularly because errors accumulate, the accuracy deteriorates with time. Here, crawlers may be provided in place of the wheels or multiple (for example, two) legs may be provided to move by walking with the legs. Also in such cases, the apparatus location and orientation (posture) can be estimated based on the motion of the two crawlers or the motion of the legs as in the case of wheels.

The communicator 43 is a module for communicating with an external device and is a wireless module that includes an antenna in the case of performing wireless communication with an external device. For example, the communicator 43 is a wireless module to perform short-range wireless communication based on the Bluetooth (registered trademark). Using the communicator 43, the autonomous mobile apparatus 100 can exchange data with an external source and the like. For example, when the user specifies a destination to the autonomous mobile apparatus 100, the user may convey information of the destination via the communicator 43.

The function of the processor 10 will be described next. The processor 10 includes a drive-based location estimator 11, a non-drive-based location estimator 12, an object location acquirer 13, a map creator 14, a move processor 15, and a map processor 16. The processor 10 estimates the apparatus location, creates an environment map, controls the move of the autonomous mobile apparatus 100, and so on. Moreover, the processor 10 has the capability of multi-threading and can execute multiple threads (different process flows) in parallel.

The drive-based location estimator 11 estimates the apparatus location and posture of the autonomous mobile apparatus 100 by acquiring odometry information from the driving unit 42.

The non-drive-based location estimator 12 estimates the apparatus location and posture of the autonomous mobile apparatus 100 by the SLAM processing using multiple images (captured images) that are captured by the imager 41 and stored in the image memory 21. The SLAM processing fails to estimate the apparatus location when there are a small number of feature points in an image. Here, information that presents whether the apparatus location can be estimated by the SLAM processing is termed tracking information and the non-drive-based location estimator 12 also acquires the tracking information. The tracking information is "tracking" or "the tracking state" if the non-drive-based location estimator 12 can estimate the apparatus location, and "being lost" or "the lost state" if the non-drive-based location estimator 12 cannot estimate the apparatus location.

The object location acquirer 13 acquires, using information from the sensor 30, an object location (relative location with reference to the location and posture of the autonomous mobile apparatus 100) that is a location of an object that is present in the surrounding area of the autonomous mobile apparatus 100. More specifically, the object location acquirer 13 acquires distance data that present the distance to an object that is detected by the range sensor 31 that is provided to the sensor 30 and the angle at which the object is detected.

The map creator 14 creates and stores in the map memory 23 an environment map on which the location where the object is present is reflected based on the apparatus location and posture that are estimated by the drive-based location estimator 11 or the non-drive-based location estimator 12, and the object location in the surrounding area that is acquired by the object location acquirer 13 (the relative location with reference to the location and posture of the autonomous mobile apparatus 100). The environment map is a map of a plane that is divided into a grid as described above and on the grid points of which the numeric values that each present the presence probability of an object that is detected by the sensor 30 are reflected.

The move processor 15 sets a moving route to the destination based on information of the environment map that is stored in the map memory 23, and controls the driving unit 42 to move the autonomous mobile apparatus 100 along the set moving route.

The map processor 16 fixes information of the stored environment map that is in the map memory 23 at the time when the non-drive-based location estimator 12 is not enabled from estimating the apparatus location. Here, "fixing information of the environment map" includes saving information of the environment map in the map saver 24 and suspending update of information of the environment map. Then, the map processor 16 unfixes information of the environment map when the non-drive-based location estimator 12 is enabled to estimate the apparatus location later. Here, "unfixing information of the environment map" means returning the environment map that is saved in the map saver 24 to the map memory 23 in a case in which information of the environment map is fixed by saving information of the environment map in the map saver 24. Moreover, "unfixing information of the environment map" means resuming update of the environment map in a case in which information of the environment map is fixed by suspending update of information of the environment map.

The functional configuration of the autonomous mobile apparatus 100 is described above. The entire configuration of the software modules that are executed by the processor 10 of the autonomous mobile apparatus 100 will be described next with reference to FIG. 4. In FIG. 4, a non-drive-based location estimation module 51 corresponds to the non-drive-based location estimator 12 that is described in the above functional configuration and a drive-based location estimation module 52 corresponds to the drive-based location estimator 11 that is described in the above functional configuration. Moreover, a map creation module 53 corresponds to the map creator 14 and a move control module 54 corresponds to the move processor 15.

As the autonomous mobile apparatus 100 is powered on, the above software modules are activated individually as different threads and start to run in parallel. The non-drivebased location estimation module 51 performs the SLAM processing using image information that is acquired from the imager 41 to estimate the apparatus location and posture. The drive-based location estimation module 52 estimates the apparatus location and posture using odometry information that is acquired from the driving unit 42. The map creation module 53 creates an environment map based on the apparatus location and posture that are estimated by the non-drive-based location estimation module 51 or the drive-based location estimation module 52 and the distance data and the angle that are obtained from the range sensor 31.

The move control module 54 sets a route based on the apparatus location and posture that are estimated by the non-drive-based location estimation module 51 or the drive-based location estimation module 52 and the environment map that is created by the map creation module 53, and creates move control information (mainly speed information) to control the driving unit 42 based on the set route. Then, the driving unit 42 is driven based on the move control information that is created by the move control module 54 to move to the destination.

Figure 5:
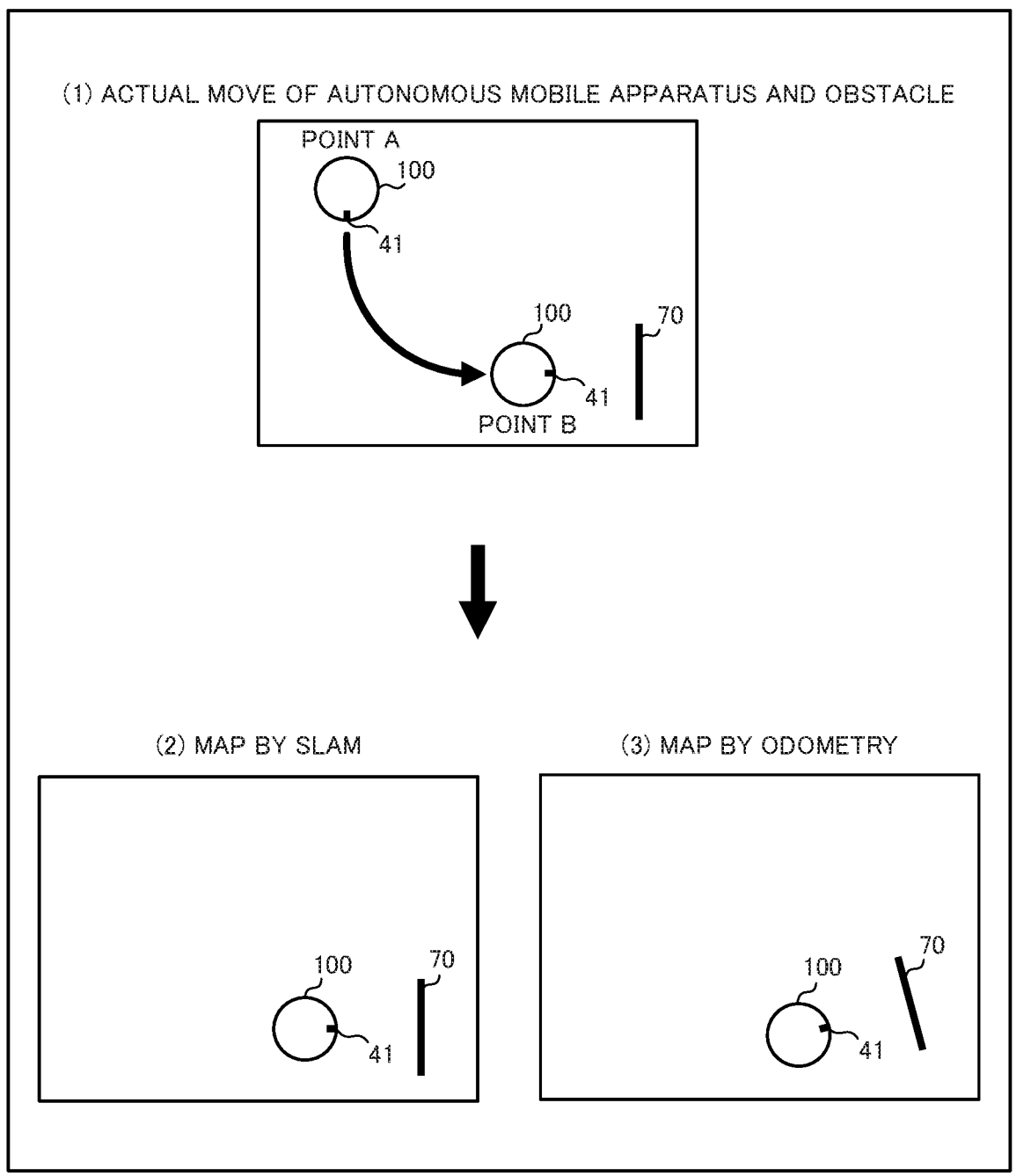
FIG. 5 is an illustration for explaining a problem to be solved by the autonomous mobile apparatus according to Embodiment 1.

Here, a problem for the autonomous mobile apparatus 100 to solve is described with reference to FIG. 5. As shown in Section (1) of FIG. 5, a case in which the autonomous mobile apparatus 100 moves from a point A to a point B by circling left and approaches an obstacle 70 is discussed. At this point, if images that are acquired by the imager 41 include many feature points, the non-drive-based location estimator 12 can estimate the apparatus location by the SLAM processing (tracking), and the map creator 14 can create a highly accurate environment map as shown in Section (2) of FIG. 5.

However, if each of images acquired by the imager 41 includes feature points not more than a reference value (for example, 10), the non-drive-based location estimator 12 cannot estimate the apparatus location by the SLAM processing (the estimation is being lost). Then, the autonomous mobile apparatus 100 estimates the apparatus location only by the drive-based location estimator 11. However, estimation of the apparatus location by the drive-based location estimator 11 is, as stated above, often less accurate because of worn-out wheels, slipping wheels, or the like. Therefore, the environment map that is created by the map creator 14 is a less accurate map as shown in Section (3) of FIG. 5. If the map is less accurate, an improper route may be set or no route may be found.

Figure 6:
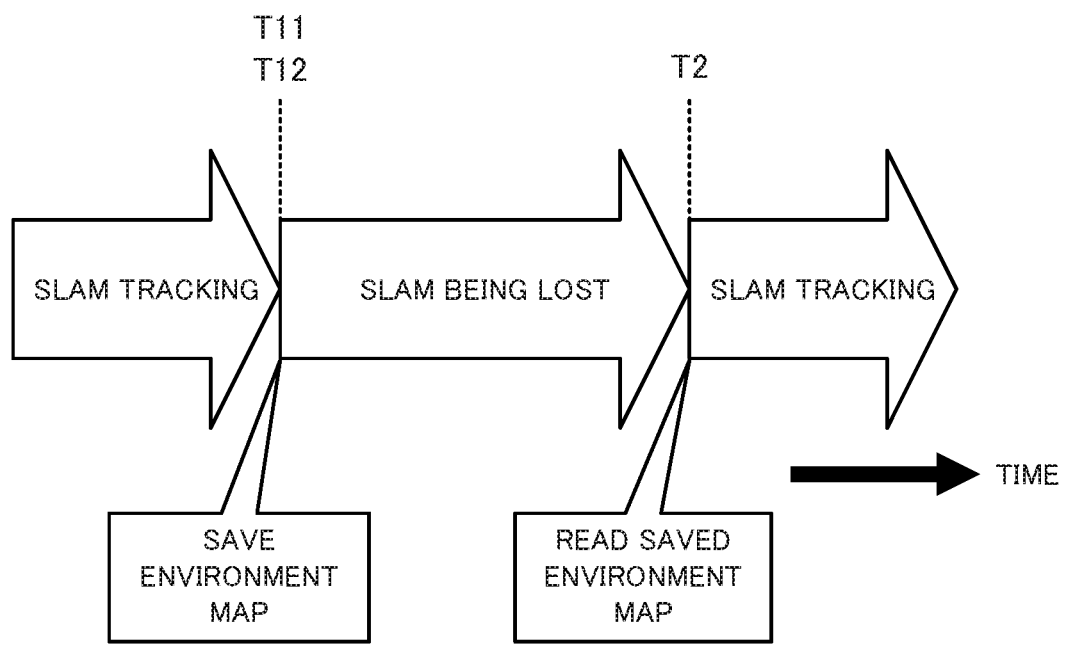
FIG. 6 is a chart for explaining a problem solution method of the autonomous mobile apparatus according to Embodiment 1.

Then, as shown in FIG. 6, the autonomous mobile apparatus 100 saves the environment map at the time when the SLAM processing falls into the lost state (time of loss: T11), and at the time when the SLAM processing returns to the tracking state (time of tracking: T2), the autonomous mobile apparatus 100 reads the environment map that is saved at the time of loss T11, whereby it is possible to delete less accurate information on the environment map while being lost and prevent the environment map from becoming less accurate. Here, the time of saving the environment map is termed the time of reference (T12). In this embodiment, the time of reference (T12)=the time of loss (T11).

The methodology for the autonomous mobile apparatus 100 to temporarily save the environment map in a case in which estimation of the apparatus location by the SLAM processing is not enabled and restore the temporarily-saved environment map when estimation of the apparatus location by the SLAM processing is enabled so that a highly accurate environment map as shown in Section (2) of FIG. 5 can be kept for as long as possible will be described below. First, details of the processing of the map creation module 53 will be described with reference to FIG. 7. In the following explanation, the environment map that is stored in the map memory 23 is presented by a two-dimensional array variable MA [i, j] and the environment map that is stored in the map saver 24 is presented by a two-dimensional array MS [i, j]. Here, assuming that xsize is the maximum grid point coordinate in the X-direction on the environment map and ysize is the maximum grid point coordinate in the Y-direction on the environment map, $0 \leq i \leq xsize$ and $0 \leq j \leq ysize$. Moreover, it is assumed that a flag variable SF that indicates whether an environment map is saved in the map saver 24 is also stored in the map saver 24 (an environment map is not saved when SF=0 and is saved when SF=1).

First, the map creator 14 initializes the environment map that is stored in the map memory 23 (Step S101). Moreover, at this point, the map saver 24 is also initialized. The environment map is initialized by setting the values of all grid points on the gridded map to zero. Specifically, MA [i, j]=0 is executed for all i and j that satisfy $0 \leq i \leq xsize$ and $0 \leq j \leq ysize$. Then, the flag variable SF that indicates whether an environment map is saved in the map saver 24 is set to zero.

Next, the processor 10 determines whether the autonomous mobile apparatus 100 finishes the operation (Step S102). The autonomous mobile apparatus 100 finishes the operation in a case in which the user powers off the autonomous mobile apparatus 100, the remaining battery level falls below a given level (for example, 3% left or the like), or the like. If the autonomous mobile apparatus 100 finishes the operation (Step S102; Yes), the procedure ends. If not finishing the operation (Step S102; No), the processor 10 performs a procedure to estimate the apparatus location to acquire the current apparatus location and posture (Step S103). Details of the procedure to estimate the apparatus location will be described later.

Next, the map processor 16 determines whether the non-drive-based location estimator 12 is not enabled from estimating the apparatus location (the tracking information of the SLAM processing has shifted from the tracking state to the lost state) (Step S104). If the non-drive-based location estimator 12 is not enabled from estimating the apparatus location (Step S104; Yes), the map processor 16 saves in the map saver 24 the environment map that is stored in the map memory 23 (Step S105). Specifically, MS [i, j]=MA [i, j] is executed for all i and j that satisfy $0 \leq i \leq xsize$ and $0 \leq j \leq ysize$ and the variable SF is set to 1. The Step S105 is also called a map control step. Then, the processing proceeds to Step S108.

If the tracking information has not shifted from the tracking state to the lost state (Step S104; No), the map processor 16 determines whether the non-drive-based location estimator 12 is enabled to estimate the apparatus location (the tracking information of the SLAM processing has shifted from the lost state to the tracking state) (Step S106). If the non-drive-based location estimator 12 is not enabled to estimate the apparatus location (Step S106; No), the processing proceeds to Step S108.

If the non-drive-based location estimator 12 is enabled to estimate the apparatus location (Step S106; Yes), the map processor 16 clears the environment map in the map memory 23 and reads the environment map that is saved in the map saver 24 into the map memory 23 (Step S107). Specifically, MA [i, j]=MS [i, j] is executed for all i and j that satisfy $0 \leq i \leq xsize$ and $0 \leq j \leq ysize$ and the variable SF is set to 0. Then, the processing proceeds to Step S108.

In the Step S108, the object location acquirer 13 acquires distance data and angles from the distance data memory 25.

The Step S108 is also called an object location acquisition step. Then, the map creator 14 converts to the coordinates on the environment map and registers on the environment map the distance data and the angles that are acquired by the object location acquirer 13 using information of the apparatus location and posture that are acquired in the Step S103 (Step S109). The Step S109 is also called a map creation step. Then, the processing returns to the Step S102.

A specific example of the registration of distance data on the environment map in the Step S109 will be described below. For example, it is assumed that the coordinates on the environment map of an object that is detected by the range sensor 31 are [m, n]. The map creator 14 first executes MA [m, n]=MA [m, n]+Δr. Here, Δr is an amount of update to add to the value of a grid point when the range sensor 31 finds presence of an object at the grid point. The value of Δr is, for example, 10. However, MA [m, n]=Lmax when MA [m, n] exceeds the maximum value Lmax as the result of adding Δr.

Next, the map creator 14 subtracts the amount of update Δr from the value of a grid point where no obstacle is detected within the observation (scan) range of the range sensor 31. Specifically, MA [i, j]=MA [i, j]−Δr is executed for all [i, j] up to [m, n] in the direction in which an obstacle is detected and for all [i, j] in the direction in which no obstacle is detected within the observation range of the range sensor 31. However, MA [i, j]=Lmin when MA [i, j] falls below the minimum value Lmin as the result of subtracting Δr.

With the above processing, the value of a grid point where an object is observed by the range sensor is increased and the value of a grid point where no object is observed within the observation range of the range sensor is decreased. As a result, the values of the grid points can be assumed to present the presence probability of an object in logarithmic odds. Here, as the values of the grid points on the environment map, instead of the logarithmic odds L, it may be possible to record a pair of the number of times of observation (the number of times of observing (scanning) a grid point by the range sensor 31) and the number of times of detection (the number of times of the range sensor 31 detecting presence of an obstacle at the location of the grid point) and define the presence probability of an obstacle at the grid point by the ratio of the number of times of detection to the number of times of observation.

Figure 7:
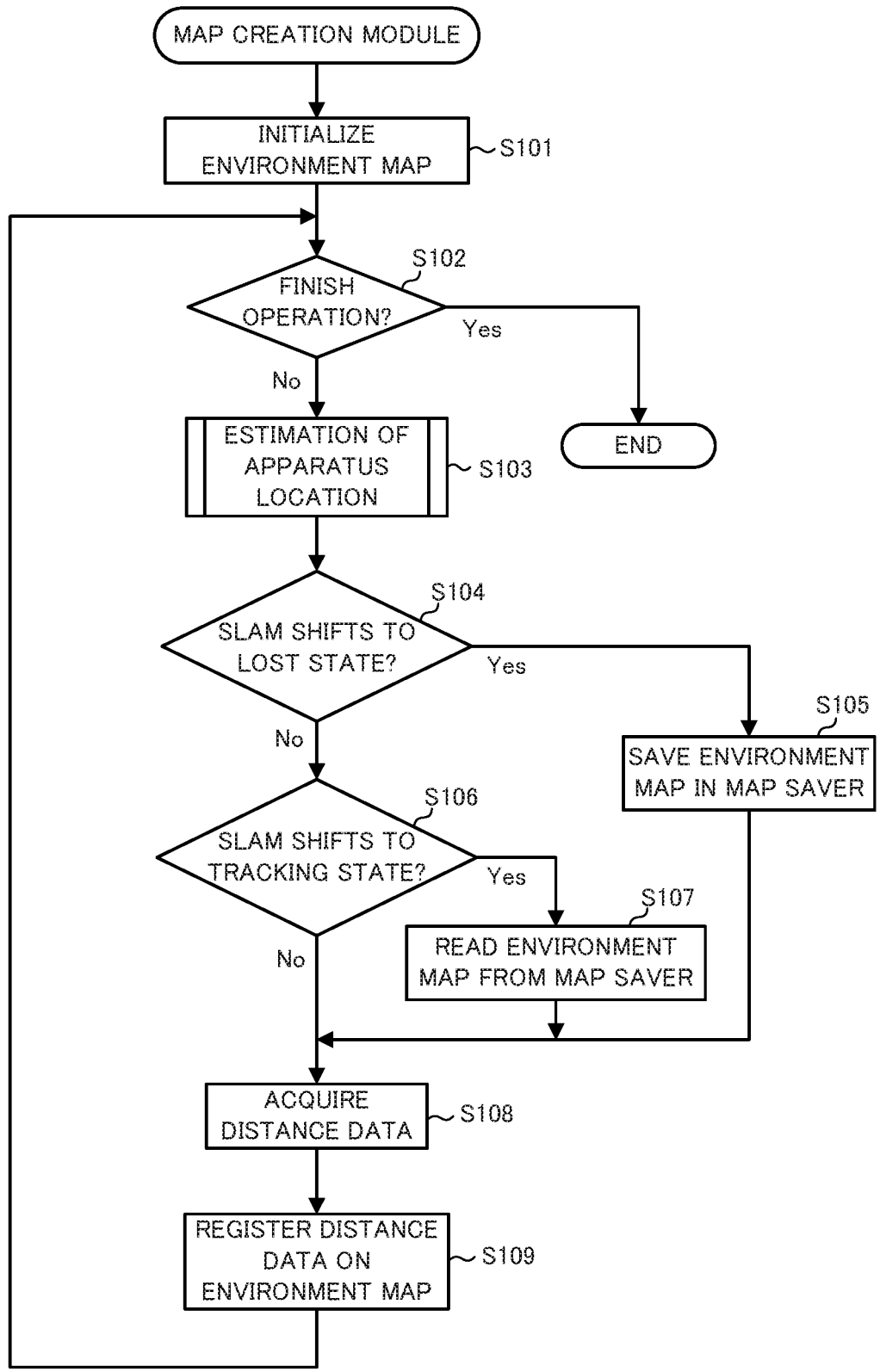
FIG. 7 is a flowchart of a map creation module according to Embodiment 1.

The flowchart of the map creation module 53 shown in FIG. 7 is described above. In the procedure of FIG. 7, the environment map after shifting to the lost state (Yes in the Step S104) and before shifting to the tracking state (Yes in the Step S106) (lost period) is a temporary environment map until the original environment map (the real environment map) is read from the map saver in the Step S107 and therefore, is also referred to as a simplified map. Then, presumably, update of the real environment map (the environment map that is saved in the map saver 24) is suspended while this temporary environment map (the simplified map) is used. Therefore, it can be said that the processing of the Step S105 is a process to fix the environment map (information thereof). Moreover, in the processing of the Step S107, the simplified map is replaced with the real environment map and update of the real environment map is resumed. Therefore, it can be said that the processing of the Step S107 is a process to unfix the environment map (information thereof).

The procedure to estimate the apparatus location that is performed in the Step S103 of FIG. 7 will be described next with reference to FIG. 8. First, the drive-based location estimator 11 acquires the apparatus location and posture of the autonomous mobile apparatus 100 based on odometry information that is obtained from the driving unit 42 (Step S201). The Step S201 is also called a drive-based location estimation step. Next, the non-drive-based location estimator 12 acquires tracking information of the SLAM processing based on information of images that are captured by the imager 41 (Step S202).

Then, the processor 10 determines whether the tracking information of the SLAM processing is "tracking" (Step S203). If the tracking information of the SLAM processing is "tracking" (Step S203; Yes), the non-drive-based location estimator 12 acquires the apparatus location and posture of the autonomous mobile apparatus 100 by the SLAM processing based on information of images that are captured by the imager 41 (Step S204). The Step S204 is also called a non-drive-based location estimation step. Then, the non-drive-based location estimator 12 outputs the apparatus location and posture by the SLAM processing to the processor 10 (Step S205) and ends the procedure.

On the other hand, if the tracking information of the SLAM processing is not "tracking" in the Step S203 (Step S203; No), the drive-based location estimator 11 obtains the difference between the apparatus location and posture that are acquired in the Step S201 of the procedure to estimate the apparatus location last time and the apparatus location and posture that are acquired in the Step S201 this time, adds the difference to the apparatus location and posture that are output to the processor 10 in the procedure to estimate the apparatus location last time, and outputs the outcome to the processor 10 (Step S206), and ends the procedure.

Figure 8:
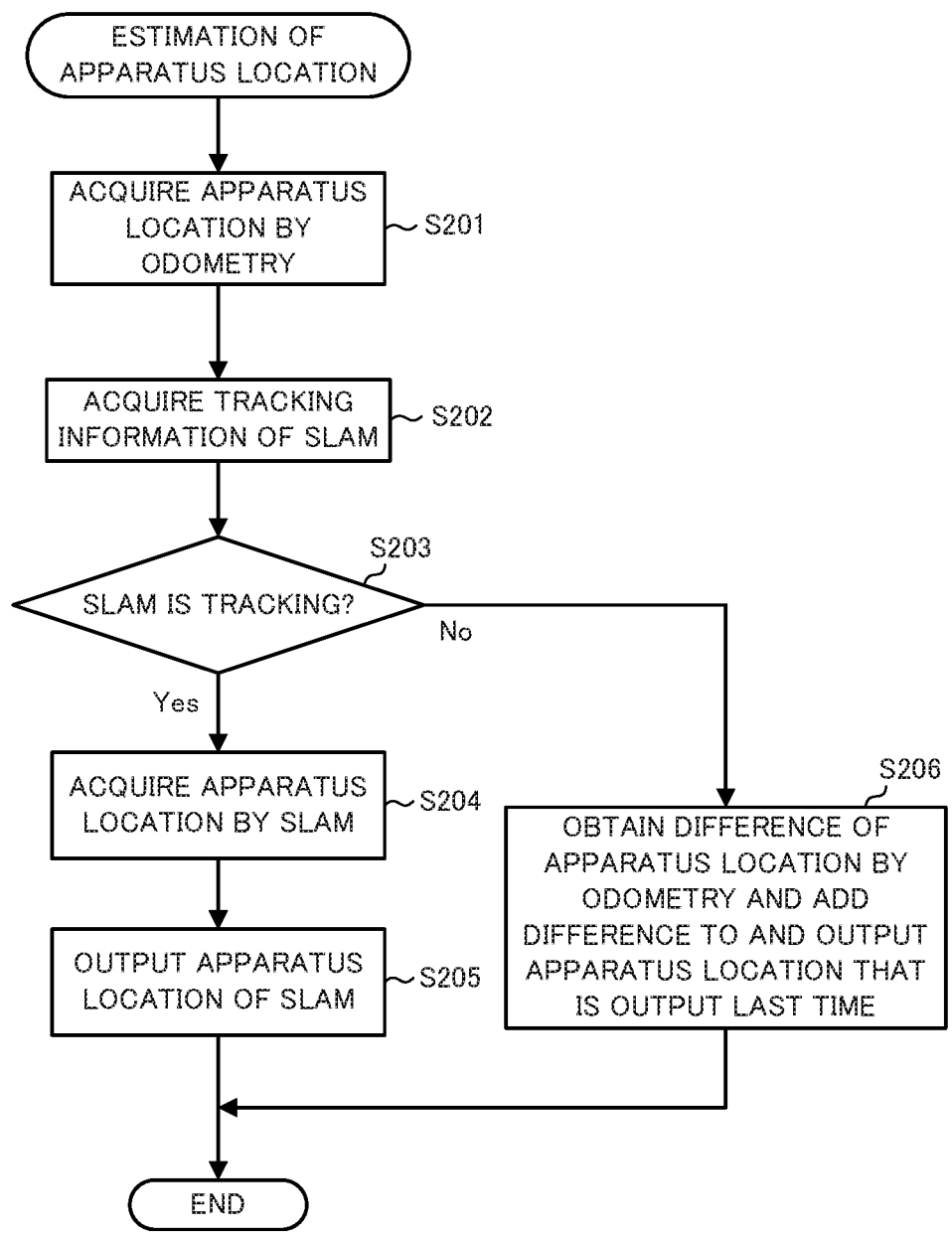
FIG. 8 is a flowchart of a procedure to estimate an apparatus location according to Embodiment 1.

The flowchart of the procedure to estimate the apparatus location shown in FIG. 8 is described above. Details of the processing of the move control module 54 to set a route to a destination using the map that is created by the map creation module 53 and control the move to the destination will be described next with reference to FIG. 9.

First, the processor 10 determines whether the autonomous mobile apparatus 100 finishes the operation (Step S301). If finishing the operation (Step S301; Yes), the procedure ends. If not finishing the operation (Step S301; No), the move processor 15 determines whether a destination is set (Step S302). The destination may be set by the user of the autonomous mobile apparatus 100 via the communicator 43 or may autonomously be set by the autonomous mobile apparatus 100 as needed (for example, a charging station is set as the destination in a case in which the remaining battery level falls below a given level (for example, 10%)).

If no destination is set (Step S302; No), the processing returns to the Step S301. If a destination is set (Step S302; Yes), the move processor 15 acquires the latest environment map at the time that is created by the map creator 14 (Step S303). Next, the move processor 15 acquires the current apparatus location and posture through the procedure to estimate the apparatus location shown in FIG. 8 (Step S304). Then, the move processor 15 sets a route from the current location to the destination based on the environment map and the apparatus location and posture that are acquired and the set destination (Step S305).

Then, the move processor 15 determines whether a route is set (whether a route exists) (Step S306). If no route exists (Step S306; No), an error procedure such as notifying the user so or the like is performed (Step S307) and the processing returns to the Step S301. If a route exists (Step S306; Yes), the move processor 15 determines whether the autonomous mobile apparatus 100 has arrived at the destination (Step S308). Here, information of the route includes information of the destination; therefore, the move processor 15 can determine whether the autonomous mobile apparatus 100 has arrived at the destination by determining whether the current location coincides with the destination that is included in the route.

If having arrived at the destination (Step S308; Yes), the move processor 15 controls the driving unit 42 to stop moving (Step S310) and returns to the Step S301. If having not arrived at the destination (Step S308; No), the move processor 15 controls the driving unit 42 to move along the route (Step S309) and returns to the Step S303.

Figure 9:
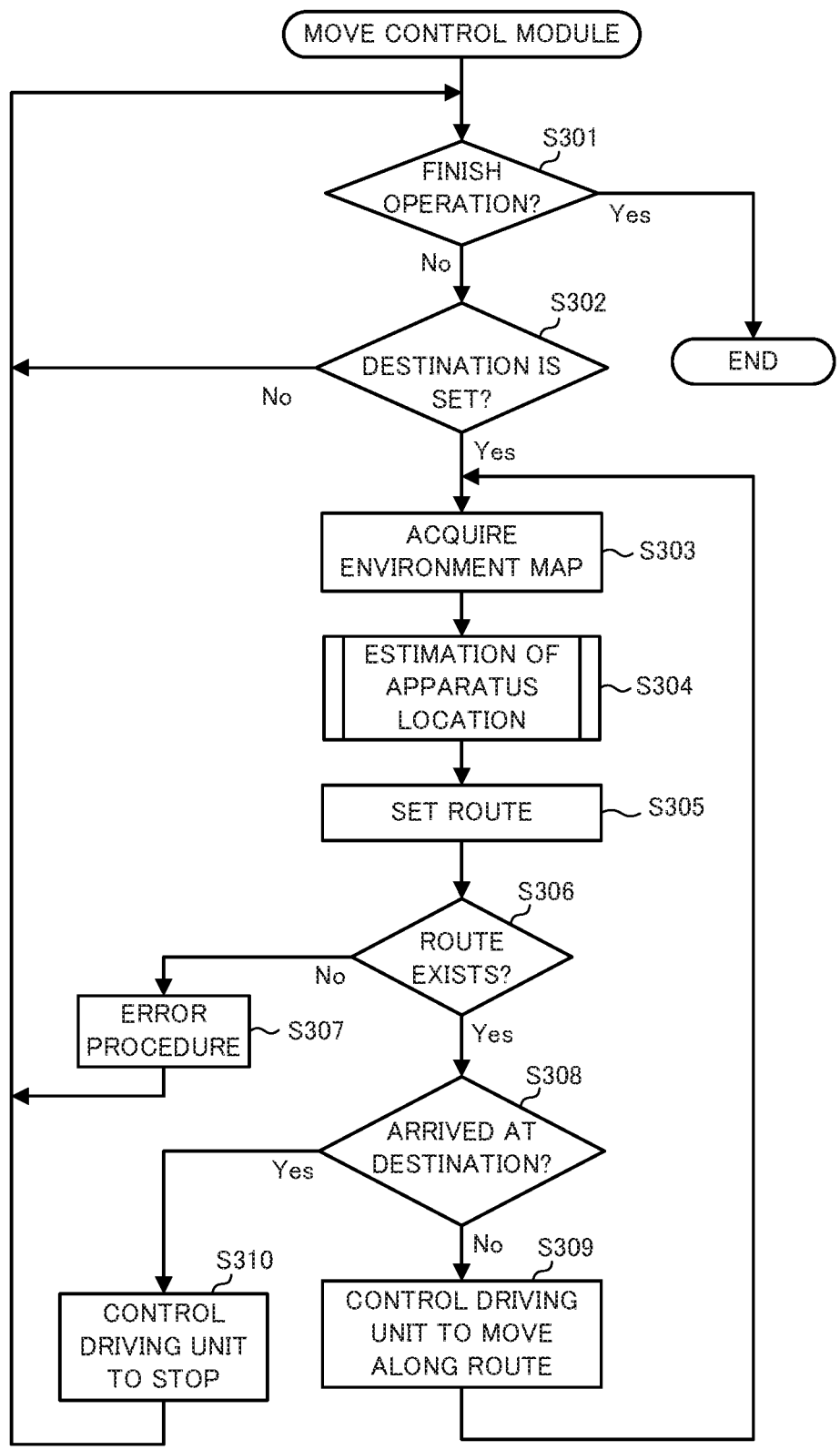
FIG. 9 is a flowchart of a move control module according to Embodiment 1.

The flowchart of the move control module 54 shown in FIG. 9 is described above. If the state of being not enabled from estimating the apparatus location by the SLAM processing (the lost state) continues for a long time, the environment map becomes less accurate. However, as described above, the autonomous mobile apparatus 100 saves the environment map when the SLAM processing falls into the lost state and reads the saved environment map when the SLAM processing returns to the tracking state, whereby it is possible to delete less accurate information that is registered on the environment map while being lost and improve the accuracy of the environment map.

Embodiment 2

When the SLAM processing returns to the tracking state, the autonomous mobile apparatus 100 according to Embodiment 1 loses data (information of the locations of obstacles and the like) that are registered on the environment map while the SLAM processing is lost. Since estimation of the apparatus location is less accurate while the SLAM processing is lost, the data are less accurate, too. Therefore, when the SLAM processing returns to the tracking state, the autonomous mobile apparatus 100 deletes all data while the SLAM processing is lost, thereby leaving only highly accurate information on the environment map. However, odometry information does not become much less accurate for a specific period immediately after shifting from the tracking state to the lost state. Moreover, it is possible to suppress deterioration in the accuracy of odometry information immediately before returning to the tracking state by back calculation based on the apparatus location after the return. Then, Embodiment 2 in which information of the apparatus location that is estimated using odometry information is used for a specific period both immediately after the tracking information of the SLAM processing shifts to the lost state and immediately before the tracking information of the SLAM processing shifts to the tracking state will be described.

Figure 10:
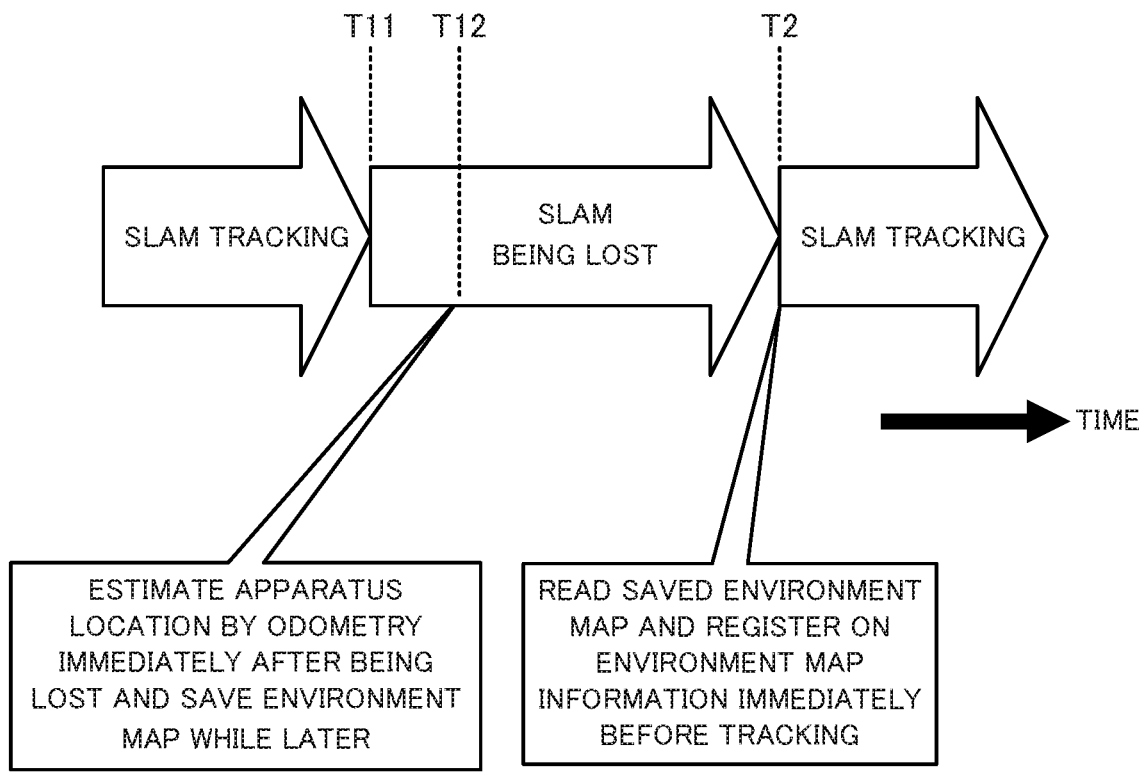
FIG. 10 is a chart for explaining a problem solution method of an autonomous mobile apparatus according to Embodiment 2 of the present disclosure.

As shown in FIG. 10, the autonomous mobile apparatus according to Embodiment 2 estimates the apparatus location with odometry information even if the SLAM processing falls into the lost state (time of loss: T11) and after a given time (reference delay time) elapses, saves the environment map at the time (time of reference: T12). Then, at the time when the SLAM processing returns to the tracking state (time of tracking: T2), the autonomous mobile apparatus reads the environment map that is saved at the time of reference T12, corrects the odometry information immediately before returning to the tracking state based on the apparatus location after returning to the tracking state, and registers on the environment map the locations of objects that are obtained while being lost based on the corrected odometry information. In this way, it is possible to delete less accurate information on the environment map while being lost without losing not much less accurate information on the environment map immediately after being lost and immediate before tracking, and thus prevent the accuracy of the environment map from deteriorating. In this embodiment, the time of reference (T12)=the time of loss (T11)+a reference delay time.

Figure 11:
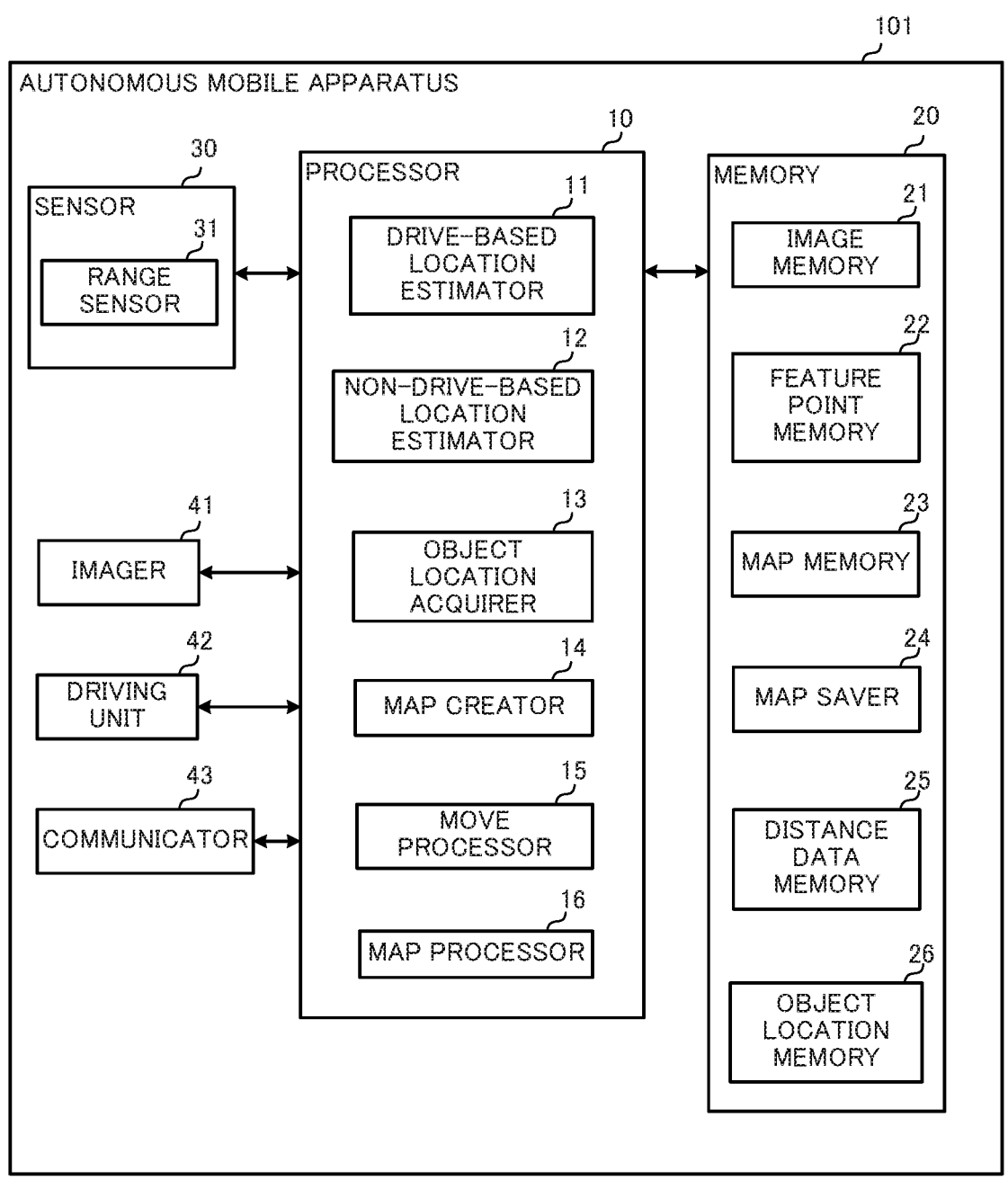
FIG. 11 is a diagram that shows a functional configuration of the autonomous mobile apparatus according to Embodiment 2.

An autonomous mobile apparatus 101 according to Embodiment 2 additionally includes, as shown in FIG. 11, an object location memory 26 in the memory 20 of the autonomous mobile apparatus 100 according to Embodiment 1.

The object location memory 26 stores history over a reference saving time (for example, three minutes) of the locations of objects in the surrounding area that are acquired by the object location acquirer 13 (the relative locations with reference to the location and the posture of the autonomous mobile apparatus 101) and the apparatus location and posture that are estimated by the drive-based location estimator 11 while the tracking information of the SLAM processing of the non-drive-based location estimator 12 is the lost state. The object location acquirer 13 acquires distance data that present the distances to the objects that are detected by the range sensor 31 and the angles at which the objects are detected. Therefore, the object location memory 26 stores history of the distance data and the angles and the apparatus location and posture that are estimated by the drive-based location estimator 11.

The entire configuration of the software modules that are executed by the processor 10 of the autonomous mobile apparatus 101 is the same as of the autonomous mobile apparatus 100 according to Embodiment 1 and shown in FIG. 4. However, the processing of the map creation module 53 of the autonomous mobile apparatus 101 is different from the processing of the map creation module 53 according to Embodiment 1 (FIG. 7) and will be described with reference to FIG. 12. The autonomous mobile apparatus 101 is the same as the autonomous mobile apparatus 100 except for this matter.

In the following explanation, as in Embodiment 1, the environment map that is stored in the map memory 23 is presented by a two-dimensional array variable MA [i, j], the environment map that is stored in the map saver 24 is presented by a two-dimensional array MS [i, j], and a flag variable that indicates whether an environment map is saved in the map saver 24 is presented by a variable SF. Moreover, data that are saved in the object location memory 26 (distance data and angles that are obtained from the range sensor 31 and the apparatus location and posture that are obtained from the drive-based location estimator 11) are presented by a one-dimensional structure array variable BS [k], the time when the data are saved is presented by a one-dimensional array variable TS [k], and the number of data that are saved in the object location memory 26 is presented by a variable BC. The initial value of BC is 0 and the value of k falls within a range of $0 \leq k < BC$.

First, the map creator 14 initializes the environment map that is stored in the map memory 23 (Step S401). Moreover, at this point, the map saver 24 and the object location memory 26 are also initialized. Specifically, MA [i, j]=0 is executed for all i and j that satisfy $0 \leq i \leq xsize$ and $0 \leq j \leq ysize$. Then, the variables SF and BC are set to zero.

Next, the processor 10 determines whether the autonomous mobile apparatus 101 finishes the operation (Step S402). If the autonomous mobile apparatus 101 finishes the operation (Step S402; Yes), the procedure ends. If not finishing the operation (Step S402; No), the object location acquirer 13 acquires distance data and angles from the distance data memory 25 (Step S403). Then, the processor 10 performs the procedure to estimate the apparatus location to acquire the current apparatus location and posture (Step S404). Here the procedure to estimate the apparatus location is the same as in Embodiment 1 and has the processing details shown in FIG. 8.

Next, the processor 10 determines whether the tracking information of the SLAM processing is "being lost" (Step S405). The tracking information to determine here is acquired in the Step S202 of the procedure to estimate the apparatus location (FIG. 8), which is executed in the Step S404. If the tracking information of the SLAM processing is not "being lost" (Step S405; No), the processor 10 determines whether an environment map is saved in the map saver 24 (Step S411). This can be found by determining whether the value of the flag variable SF is 1 or 0. If no environment map is saved in the map saver 24 (Step S411; No), the processing proceeds to Step S419.

If an environment map is saved in the map saver 24 (Step S411; Yes), the map processor 16 clears the environment map in the map memory 23, reads the environment map that is saved in the map saver 24 into the map memory 23, and deletes the environment map that is saved in the map saver 24 (Step S412). Specifically, MA [i, j]=MS [i, j] is executed for all i and j that satisfy $0 \le i \le xsize$ and $0 \le j \le ysize$ and the variable SF is set to 0.

Then, the map processor 16 determines whether there are data in the object location memory 26 (Step S413). Specifically, it is determined whether the variable BC is 1 or higher or 0. The BC that is equal to or higher than 1 means that there are data and the BC of 0 means there are no data. If there are no data in the object location memory 26 (Step S413; No), the processing proceeds to Step S419.

If there are data in the object location memory 26 (Step S413; Yes), the map processor 16 acquires the distance data and the angles and the apparatus location and posture from the object location memory 26 (Step S414). Specifically, the map processor 16 acquires the value of the one-dimensional structure array variable BS [BC−1]. Then, the map processor 16 obtains the difference between the apparatus location and posture that are acquired in the Step S414 and the latest apparatus location and posture that are estimated by the drive-based location estimator 11 (Step S415). Next, the map processor 16 adds the difference that is obtained in the Step S415 to the latest apparatus location and posture that are estimated by the non-drive-based location estimator 12 to estimate the past apparatus location (Step S416).

Then, the map processor 16 converts to the coordinates on the environment map and registers on the environment map the distance data and the angles that are obtained in the Step S414 using information of the past apparatus location that is estimated (Step S417). Then, the map processor 16 deletes from the object location memory 26 the distance data and the angles and the apparatus location and posture that are acquired in the Step S414 (Step S418). Specifically, the value of the variable BC is decremented by 1. Then, the processing returns to the Step S413.

On the other hand, if the tracking information of the SLAM processing is "being lost" in the determination of the Step S405 (Step S405; Yes), the map processor 16 determines whether a reference delay time (for example, three minutes) has elapsed since the tracking information of the SLAM processing shifts from "tracking" to "being lost" (Step S406). If the reference delay time has not elapsed (Step S406; No), the processing proceeds to Step S419.

If the reference delay time has elapsed (Step S406; Yes), the map processor 16 determines whether an environment map is already saved in the map saver 24 (Step S407). Specifically, it is determined whether the variable SF is 1 or 0. If an environment map is already saved in the map saver 24 (Step S407; Yes), the processing proceeds to Step S409. If no environment map is saved in the map saver 24 (Step S407; No), the map processor 16 saves in the map saver 24 the environment map that is stored in the map memory 23 (Step S408). Specifically, MS [i, j]=MA [i, j] is executed for all i and j that satisfy $0 \le i \le xsize$ and $0 \le j \le ysize$ and the variable SF is set to 1. Then, the processing proceeds to Step S409.

In the Step S409, the map processor 16 saves in the object location memory 26 the distance data and the angles that are acquired in the Step S403 and the apparatus location and posture that are acquired in the Step S404. Specifically, these values (the distance data and the angles and the apparatus location and posture) are saved in the one-dimensional structure array variable BS [BC], the current time is saved in the one-dimensional array variable TS [BC], and the value of the variable BC is incremented by 1.

Next, the map processor 16 deletes from the object location memory 26 data prior to the reference saving time among data that are saved in the object location memory 26 (Step S410). Specifically, the map processor 16 looks for those less than (the current time minus the reference saving time) among the values of the one-dimensional array TS [k] within a range of $0 \le k < BC-1$, and if found (the found one is referred to as TS [p]), BS [k]=BS [k+p+1] and TS [k]=TS [k+p+1] are executed for all k that satisfy $0 \le k < BC-p-1$ in sequence from the lowest k. Then, p+1 is subtracted from the variable BC.

Then, the map creator 14 converts to the coordinates on the environment map and registers on the environment map the distance data and the angles that are acquired in the Step S403 using information of the apparatus location and posture that are acquired in the Step S404 (Step S419). A specific example of the registration on the environment map here is the same as the specific example in the Step S109 of FIG. 7. Then, the processing returns to the Step S402.

With the above-described map creation module according to Embodiment 2, even in a case in which the SLAM processing of the non-drive-based location estimator 12 falls into the lost state, if the SLAM processing returns to the tracking state before a reference delay time elapses, information that is reflected on the environment map in the meantime is not lost. Moreover, even if the SLAM processing cannot return to the tracking state before a reference delay time elapses, it is possible to reduce the time for which no information is reflected on the environment map. Then, the odometry information during the reference delay time and the reference saving time includes small errors, whereby it is possible to suppress deterioration in the accuracy of environment map.

Figure 12:
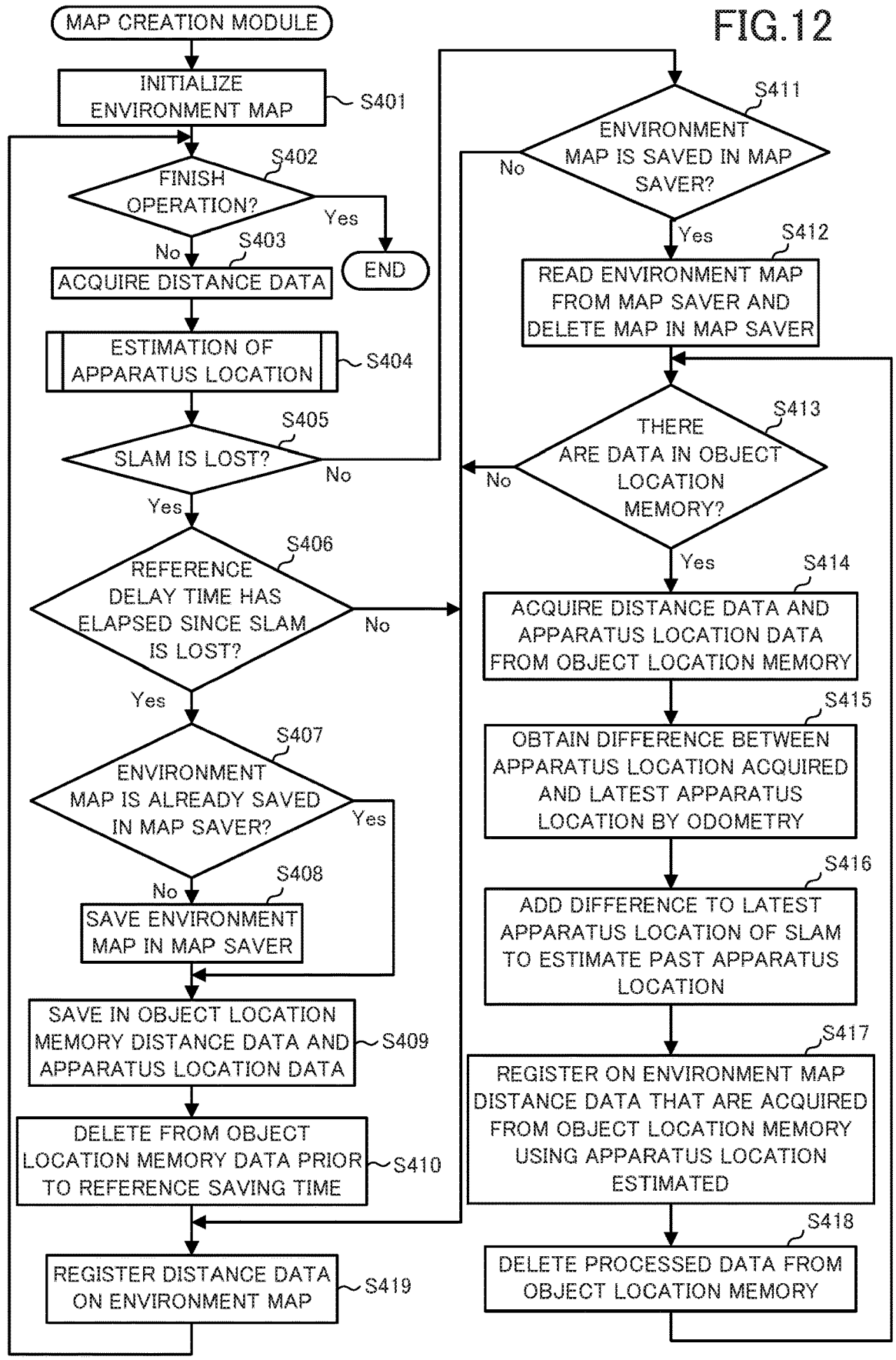
FIG. 12 is a flowchart of a map creation module according to Embodiment 2.

In Embodiment 2, the map processor 16 determines whether a reference delay time has elapsed since the tracking information of the SLAM processing shifts from "tracking" to "being lost" in the Step S406 of FIG. 12. However, this is not restrictive. For example, in the Step S406 the map processor 16 may determine whether the autonomous mobile apparatus 101 has moved over a given distance (for example, 3 m) since the tracking information of the SLAM processing shifts from "tracking" to "being lost," and proceeds to the Step S407 if having moved and proceeds to the Step S419 if not having moved. This is because the accuracy of odometry of the autonomous mobile apparatus 101 deteriorates also according to the moving distance and presumably, even if continuing estimation of the apparatus location by the odometry, the accuracy does not deteriorate much while the moving distance is small. As a result, it is possible to further reduce the time for which no information is reflected on the environment map.

Moreover, in Embodiment 2, the map processor 16 deletes from the object location memory 26 data prior to the reference saving time among data that are saved in the object location memory 26 in the Step S410 of FIG. 12. However, this is not restrictive. For example, in the Step S410, the map processor 16 may delete from the object location memory 26 data that are separated (in the distance along the moving route) more than a reference moving distance (for example, 3 m) from the current apparatus location among past data that are saved in the object location memory 26. As a result, at a time of return to the tracking, the autonomous mobile apparatus 101 can register on the environment map data in the object location memory that fall within a moving range equal to or less than a reference moving distance from the apparatus location at the time (the time of tracking: T2). This is because, as stated above, presumably, the accuracy of estimation of the apparatus location by the odometry does not deteriorate much while the moving distance is small. As a result, it is possible to further reduce the time for which no information is reflected on the environment map.

Modified Embodiment 1

In the above-described embodiments, the non-drive-based location estimator 12 estimates the apparatus location and posture of the autonomous mobile apparatus 100 or 101 by the SLAM processing. However, this is not restrictive. For example, it may be possible that the autonomous mobile apparatus includes an electric wave receiver that acquires electric waves from a global positioning system (GPS) satellite and the non-drive-based location estimator 12 estimates the apparatus location and posture based on information that is included in the electric waves from the GPS satellite. Moreover, not only electric waves from a GPS satellite but also electric waves from a cell-phone base station, electric waves from a wireless local area network (LAN) base station, a radio frequency identifier (RFID), or the like may be used to estimate the apparatus location. Moreover, in such cases, information of the orientation (posture) of the autonomous mobile apparatus can be obtained by providing a direction sensor to the autonomous mobile apparatus.

When the non-drive-based location estimator 12 estimates the apparatus location using electric waves, the processor 10 determines whether the non-drive-based location estimator 12 can estimate the apparatus location based on the electric waves reception status. In other words, the non-drive-based location estimator 12 is in the tracking state in a case in which enough electric waves to estimate the apparatus location are received and is in the lost state in a case in which enough electric waves to estimate the apparatus location are not received.

The autonomous mobile apparatus according to the above Modified Embodiment 1 can create a highly accurate environment map based on information from the electric wave receiver even in the case in which estimation of the apparatus location by the SLAM processing is not enabled. Moreover, by saving the environment map in the case in which information from the electric wave receiver becomes unavailable and reading the saved environment map in the case in which information from the electric wave receiver becomes available, it is possible to delete less accurate information that is registered on the environment map while no information is obtained by the electric wave receiver and improve the accuracy of the environment map.

Modified Embodiment 2

In the above-described embodiments, the sensor 30 includes the range sensor 31. However, this is not restrictive. Here, Modified Embodiment 2 in which the sensor 30 includes a collision sensor that detects collision with an object is described.

Figure 13:
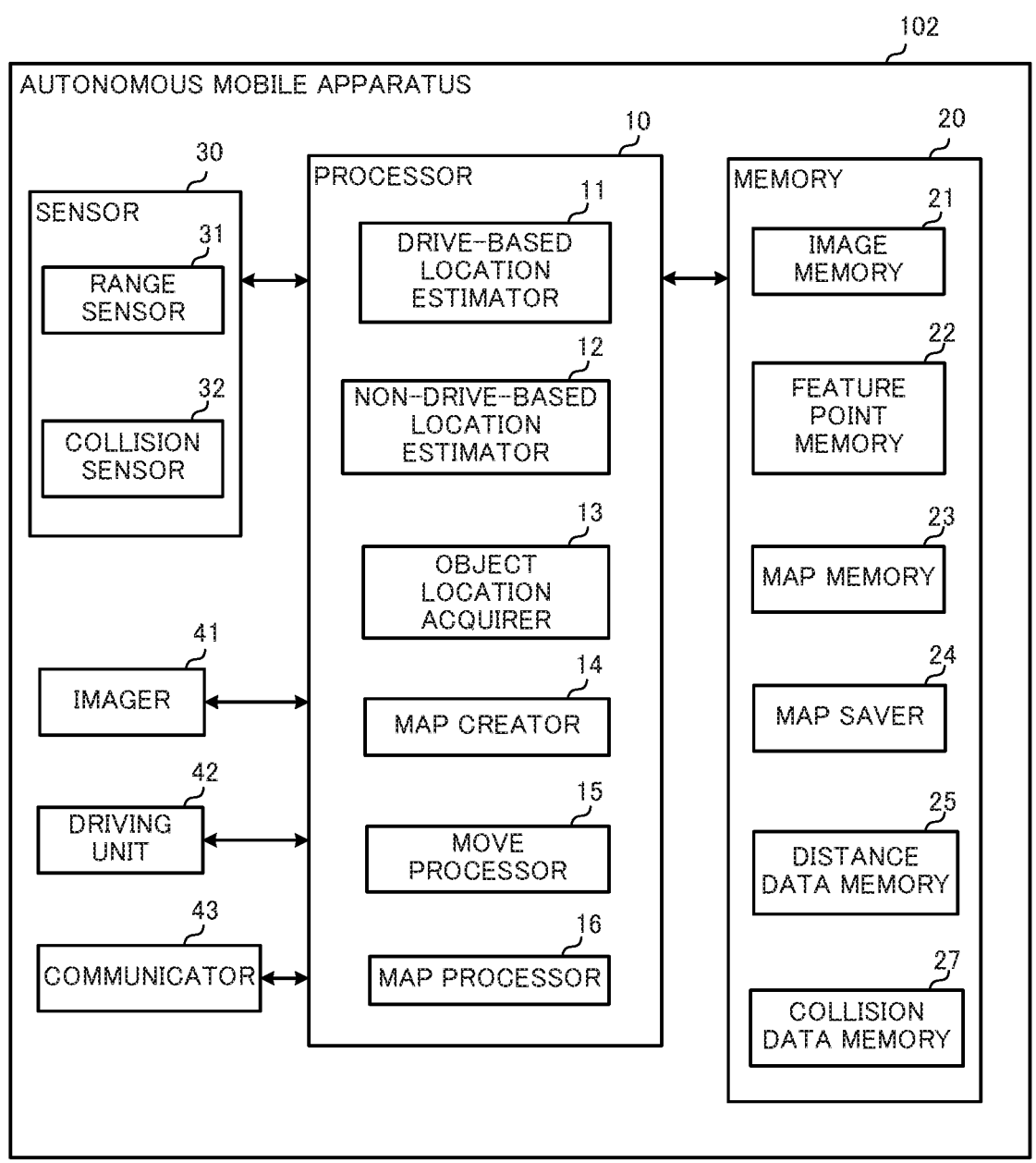
FIG. 13 is a diagram that shows a functional configuration of an autonomous mobile apparatus according to Modified Embodiment 2 of the present disclosure.

An autonomous mobile apparatus 102 according to Modified Embodiment 2 additionally includes, as shown in FIG. 13, a collision sensor 32 that detects collision with an object in the sensor 30 and a collision data memory 27 in the memory 20. The collision data memory 27 stores data (collision data) that present the object location (the relative location and the direction with respect to the center location and the front face of the autonomous mobile apparatus 102) that came into collision, which are obtained based on the position on the autonomous mobile apparatus 102 of the collision sensor 32 that detects the collision.

Figure 14:
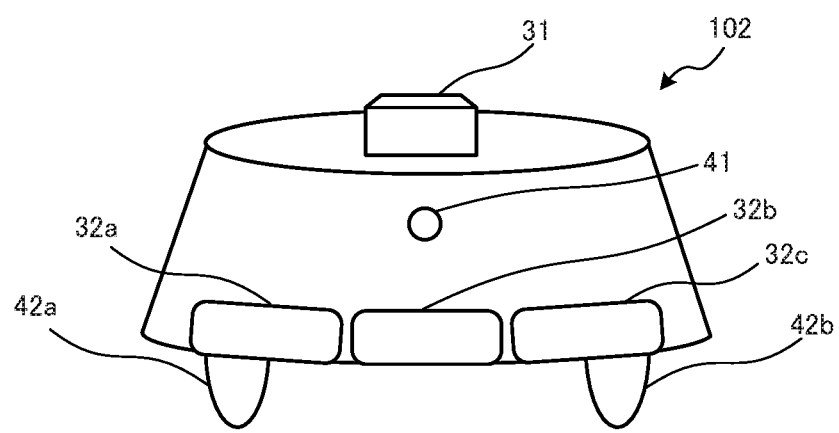
FIG. 14 is an illustration that shows an appearance of the autonomous mobile apparatus according to Modified Embodiment 2.

Any number of collision sensors 32 can be provided. In the example of FIG. 14, the autonomous mobile apparatus 102 includes, as the collision sensor 32, a collision sensor 32b on the front of the autonomous mobile apparatus 102, a collision sensor 32a to the right of the front, and a collision sensor 32c to the left of the front. As an object collides with these collision sensors 32, the collision sensor 32 that came into collision notifies the processor 10 of detection of a collision. Then, the processor 10 registers in the collision data memory 27 collision data that present the location of a collided object based on the apparatus location and orientation of the autonomous mobile apparatus 102 at the time and the position on the autonomous mobile apparatus 102 of the collision sensor 32 that gave notice of the detection of collision.

Figure 15:
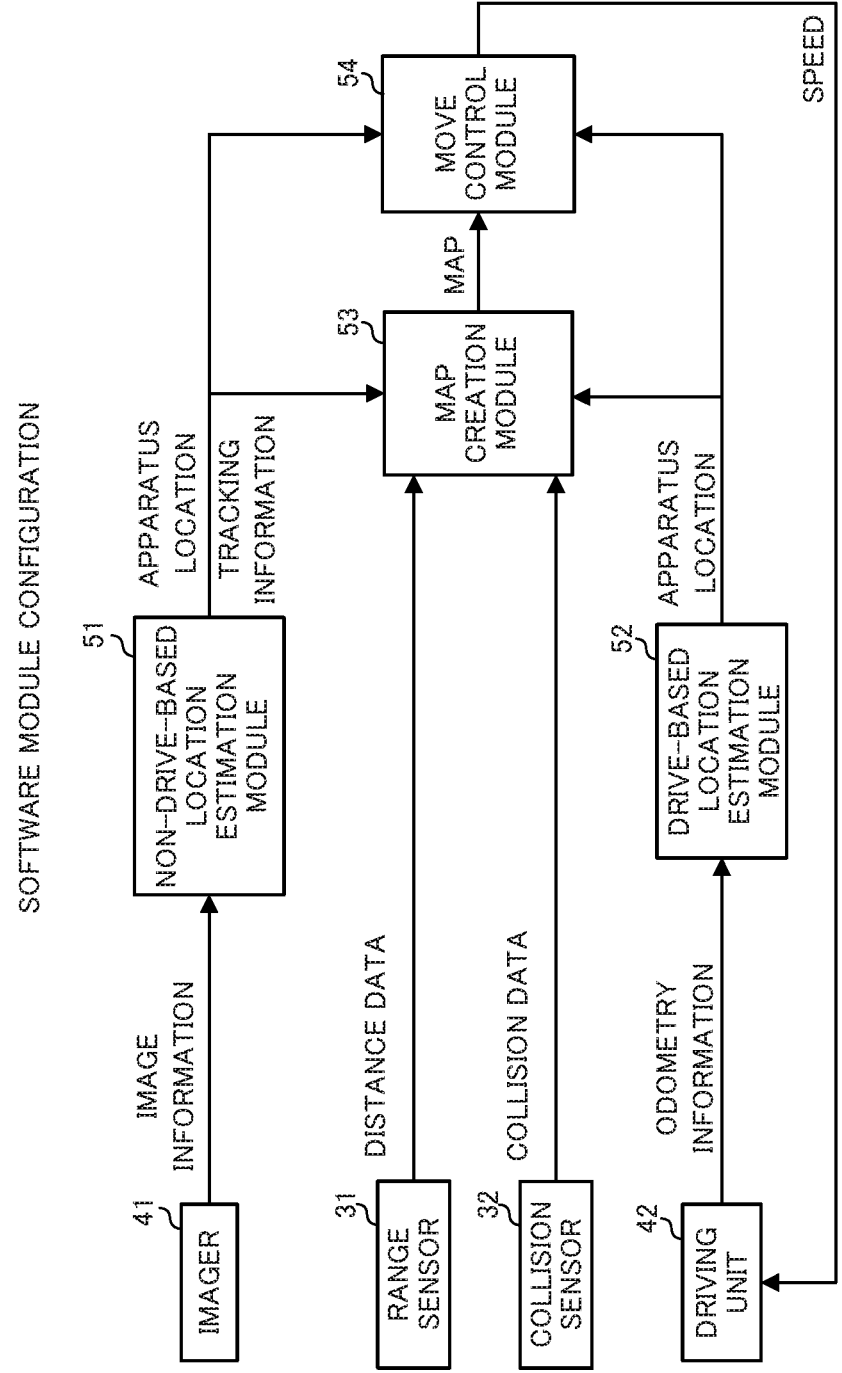
FIG. 15 is a diagram that shows the entire configuration of software modules of the autonomous mobile apparatus according to Modified Embodiment 2.

The entire configuration of the software modules that are executed by the processor 10 of the autonomous mobile apparatus 102 additionally includes, as shown in FIG. 15, the collision sensor 32 in the entire configuration of the software modules of the autonomous mobile apparatus 100 that is described with reference to FIG. 4. The map creation module 53 of the autonomous mobile apparatus 102 creates the environment map using collision data that are obtained from the collision sensor 32 as well. The autonomous mobile apparatus 102 is the same as the autonomous mobile apparatus 100 except for this matter.

Figure 16:
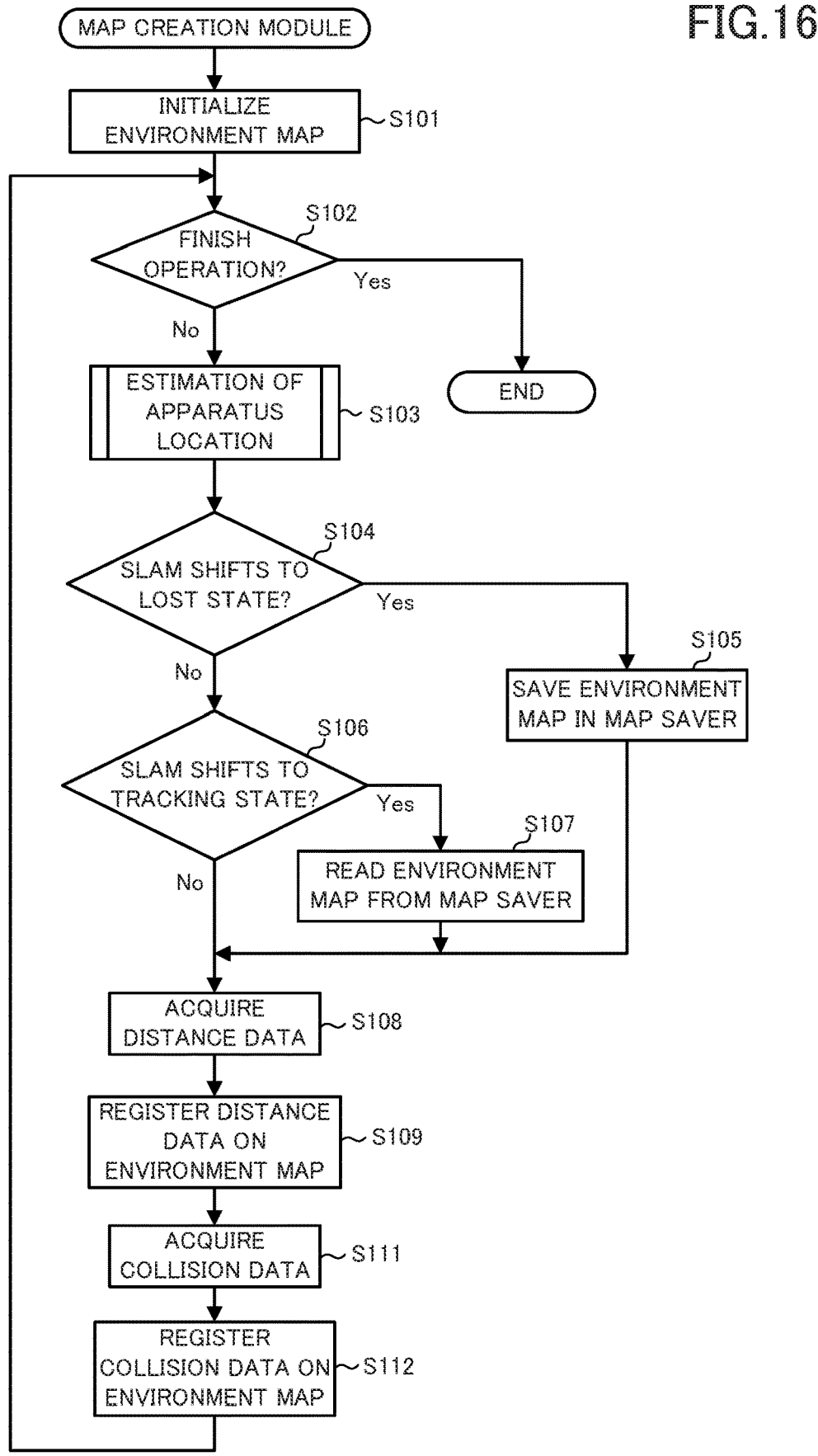
FIG. 16 is a flowchart of a map creation module according to Modified Embodiment 2.

Details of the processing of the map creation module 53 of the autonomous mobile apparatus 102 will be described with reference to FIG. 16. This processing is the same in detail as the processing of the map creation module 53 of the autonomous mobile apparatus 100 that is described with reference to FIG. 7 except for some part. The difference will mainly be described.

The processing of the Steps S101 through S109 is the same as in the processing of FIG. 7. Following the Step S109, the object location acquirer 13 acquires collision data from the collision data memory 27 (Step S111). Then, the map creator 14 converts to the coordinates on the environment map and registers on the environment map the collision data that are acquired in the Step S111 using information of the apparatus location and posture that are acquired in the Step S103 (Step S112). Then, the processing returns to the Step S102.

A specific example of the registration of collision data on the environment map in the Step S112 will be described below. For example, it is assumed that the coordinates on the environment map of an object that is detected by the collision sensor 32 are [m, n]. The map creator 14 first executes MA [m, n]=MA [m, n]+Δc. Here, Δc is an amount of update to add to the value of a grid point when presence of an object at the grid point is found by the collision sensor 32. The value of Δc is, for example, 10. However, MA [m, n]=Lmax in a case in which MA [m, n] exceeds the maximum value Lmax as the result of adding Δc.

Next, the map creator 14 subtracts the amount of update Δc from the value of a grid point that corresponds to the current apparatus location of the autonomous mobile apparatus 102. Specifically, the map creator 14 executes MA [p, q]=MA [p, q]−Δc in a case in which the coordinates of the apparatus location are [p, q]. However, MA [m, n]=Lmin in a case in which MA [p, q] falls under the minimum value Lmin as the result of subtracting Δc.

An example of the method of updating the map is described above. Presumably, data that are obtained by the range sensor 31 often include many errors while data that are obtained by the collision sensor 32 include almost no errors. Therefore, it may be possible that the map creator 14 executes MA [m, n]=Lmax in a case in which the coordinates on the environment map of an object that is detected by the collision sensor 32 are [m, n], and the map creator 14 executes MA [p, q]=Lmin in a case in which the coordinates of the apparatus location at the time are [p, q]. Moreover, the value of Δc may be changed for each of the coordinates of the grid points.

Moreover, it may be possible that the map creator 14 prepares an environment map that is obtained from the range sensor 31 and an environment map that is obtained from the collision sensor 32 separately and creates an integrated environment map from these environment maps. For example, the map creator 14 creates an environment map that is obtained from the range sensor 31 in a two-dimensional array MA [i, j], creates an environment map that is obtained from the collision sensor 32 in a two-dimensional array MB [i, j], and creates an environment map in which these environment maps are integrated in a two-dimensional array MI [i, j] as follows: (1) MI [i, j]=min (MA [i, j], MB [i, j]) if MA [i, j]<0 and MB [i, j]<0 and (2) MI [i, j]=max (MA [i, j], MB [i, j]) if MA [i, j]≥0 or MB [i, j]≥0.

In a case in which the map creator 14 prepares multiple environment maps for multiple sensors that are included in the sensor 30 as described above, the map saver 24 also prepares a region in which multiple environment maps can be saved and the map processor 16 saves each of the multiple environment maps in the map saver 24. For example, in a case in which the map creator 14 creates an environment map that is obtained from the range sensor 31 in a two-dimensional array MA [i, j] and creates an environment map that is obtained from the collision sensor 32 in a two-dimensional array MB [i, j], the map saver 24 stores a two-dimensional array MAS [i, j] for saving the environment map that is obtained from the range sensor 31 and a two-dimensional array MBS [i, j] for saving the environment map that is obtained from the collision sensor 32.

With the above processing of the map creation module, even if there is an object the range sensor 31 cannot detect, the autonomous mobile apparatus 102 according to Modified Embodiment 2 can detect the object by the collision sensor 32 and register the object on the environment map when colliding with the object. Then, if the SLAM processing is in the tracking state at the time of such registration, information of the object is treated as highly accurate information and is not deleted from the environment map. On the other hand, if the SLAM processing is in the lost state at the time of such registration, information of the object is treated as less accurate information and deleted when returning to the tracking state. In this way, the accuracy of the environment map can be improved.

Modified Embodiment 3

The sensors that are provided to the sensor 30 are not restricted to the range sensor 31 and the collision sensor 32. It may be possible that the sensor 30 includes a cliff sensor that checks whether there is a floor in the surrounding area and thus detects a cliff (a hole, a precipice, or the like) that is a place where there is no floor and the map creator 14 reflects on the environment map information of the cliff that is detected by the cliff sensor. Moreover, the sensor 30 may comprise, for example, a floor surface sensor that detects a rough path, a moisture sensor that detects a wet floor part or a pool of water, and the like. Increasing the number of types of sensors that are provided to the sensor 30 enables the autonomous mobile apparatus to create an environment map that flexibly deals with various environments.

In the above-described Embodiment 1 and Modified Embodiment 2, the distance data memory 25 stores distance data (relative location data from the autonomous mobile apparatus) that present the distance to an object that is detected by the range sensor 31 along with information of the angle at which the object is detected. However, this is not restrictive. For example, the distance data memory 25 may store data that present the location (the absolute location) of an object (an obstacle) that is detected by the range sensor 31, which are obtained based on the apparatus location and orientation of the autonomous mobile apparatus when the range sensor 31 observes (scans) the surrounding area and the distance data and the angle that are acquired by the range sensor 31. In this way, it is unnecessary to convert the distance data to the coordinates on the environment map when the distance data are registered on the environment map in the map creation module (FIG. 7 and FIG. 16).

The same applies to the collision data memory 27 in the above-described Modified Embodiment 2. The collision data memory 27 may store data that present the location (the absolute location) of a collided object (an obstacle), which are obtained based on the apparatus location and orientation of the autonomous mobile apparatus 102 when the collision sensor 32 detects the collision and the position on the autonomous mobile apparatus 102 of the collision sensor 32 that detects the collision. In this way, it is unnecessary to convert the collision data to the coordinates on the environment map when the collision data are registered on the environment map in the map creation module (FIG. 16).

Moreover, in the above-described embodiments, it may be possible to eliminate the range sensor 31, alternatively provide a depth camera or a sonar, and reflect on the environment map an obstacle that is observed by them.

Moreover, in the above-described embodiments, it may be possible to eliminate the range sensor 31, alternatively detect an obstacle by the visual SLAM processing using images that are captured by the imager 41, and reflect on the environment map the obstacle that is detected by the visual SLAM processing.

The functions of the autonomous mobile apparatuses 100, 101, and 102 can be implemented by a computer such as a conventional personal computer (PC). Specifically, the above embodiments are described on the assumption that the program for the autonomous move control procedure that is executed by the autonomous mobile apparatuses 100, 101, and 102 is prestored in the ROM of the memory 20.

However, the program may be saved and distributed on a non-transitory computer-readable recording medium such as a flexible disc, a compact disc read only memory (CD-ROM), a digital versatile disc (DVD), and a magneto-optical disc (MO) and read into and installed on a computer to configure a computer that can realize the above-described functions.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An autonomous mobile apparatus, comprising:
    a driving unit configured to move the autonomous mobile apparatus;
    a memory comprising a map memory; and
    a processor configured to:
        estimate, based on information from the driving unit, an apparatus location that is a location of the autonomous mobile apparatus;
        estimate the apparatus location based on information from other than the driving unit;
        acquire an object location that is a location of an object that is present in a surrounding area of the autonomous mobile apparatus;
        create, based on the apparatus location estimated based on the information from the driving unit or the information from other than the driving unit and the acquired object location, an environment map that includes the object location, and store the created environment map in the map memory; and
        use, at a time of tracking when the estimation of the apparatus location based on the information from other than the driving unit is enabled, the stored environment map that is in the map memory at a time of reference that is determined by a time of loss when the estimation of the apparatus location based on the information from other than the driving unit is not enabled.

2. The autonomous mobile apparatus according to claim 1, wherein
    the memory further comprises a map saver, and
    the processor is configured to save in the map saver the stored environment map that is in the map memory at the time of reference, and return, at the time of tracking, the environment map saved in the map saver to the map memory.

3. The autonomous mobile apparatus according to claim 1, wherein the processor is configured to suspend update of the stored environment map that is in the map memory at the time of reference, and resume the update of the environment map at the time of tracking.

4. The autonomous mobile apparatus according to claim 1, further comprising:
    an imager configured to acquire an image of the surrounding area,
    wherein the processor is configured to estimate the apparatus location based on the information of the image acquired by the imager as the information from other than the driving unit.

5. The autonomous mobile apparatus according to claim 1, wherein the processor is configured to acquire the object location using information from a range sensor configured to acquire distance data that are a distance to the object.

6. The autonomous mobile apparatus according to claim 1, wherein the processor is configured to acquire the object location using information from a collision sensor configured to detect collision with the object.

7. The autonomous mobile apparatus according to claim 1, wherein the time of reference is after a reference delay time or after movement over a given distance since the time of loss when the estimation of the apparatus location based on the information from other than the driving unit is not enabled.

8. The autonomous mobile apparatus according to claim 7, wherein
    the memory further comprises an object location memory that saves a history of (i) the object location acquired by the processor for a reference saving time or the object location within a reference moving distance and (ii) the apparatus location estimated by the processor based on the information from the driving unit for the reference saving time or within the reference moving distance, and
    the processor is configured to, at the time of tracking, reflect the object location that is acquired for the reference saving time prior to a time when the time of tracking comes or the object location within the reference moving distance from the apparatus location at a time when the time of tracking comes, on the stored environment map that is in the map memory at the time of reference, based on (i) the apparatus location that is estimated based on the information from other than the driving unit and (ii) the object location and the apparatus location that are saved in the object location memory, and use the environment map.

9. The autonomous mobile apparatus according to claim 8, wherein the processor is configured to, at the time of tracking, estimate the object location for the reference saving time prior to the time when the time of tracking comes or the object location within the reference moving distance from the apparatus location at the time when the time of tracking comes and reflect the estimated object location on the environment map by obtaining a difference between the apparatus location estimated based on the information from other than the driving unit and the apparatus location estimated based on the information from the driving unit and by adding the difference to the object location and the apparatus location that are saved in the object location memory.

10. The autonomous mobile apparatus according to claim 1, wherein
    the processor is configured to calculate a presence probability of the object at a location on the environment map that corresponds to the acquired object location and reflect the presence probability on the environment map.

11. The autonomous mobile apparatus according to claim 10, wherein the processor is configured to:
    check whether an object is present in each of predetermined directions, and acquire distance data that are a distance to the object in a case in which presence of the object is found; and
    reflect on the environment map a ratio of a number of times of acquisition of the distance data to a number of times of checking of the presence of the object as the presence probability.

12. The autonomous mobile apparatus according to claim 10, wherein the processor is configured to reflect the presence probability on the environment map in logarithmic odds.

13. The autonomous mobile apparatus according to claim 1, wherein the processor is configured to:
create multiple environment maps for types of information that is used for acquisition of the object location; and
fix the multiple environment maps separately.

14. An autonomous mobile apparatus comprising:
a processor configured to:
estimate an apparatus location that is a location of the autonomous mobile apparatus, while creating an environment map;
save the environment map in a map saver or suspend update of the environment map, in a case in which estimation of the apparatus location is not enabled; and
use the saved environment map or the environment map the update of which is suspended, in a case in which the estimation of the apparatus location is enabled.

15. The autonomous mobile apparatus according to claim 14, wherein the processor is configured to:
create a simplified map using odometry information and use the created simplified map during a lost period in which estimation of the apparatus location with a captured image for creating an environment map is not enabled; and
in a case in which the estimation of the apparatus location with the captured image is enabled, replace the simplified map with the environment map saved in the case in which the estimation of the apparatus location is not enabled or the environment map the update of which is suspended in the case in which the estimation of the apparatus location is not enabled.

16. The autonomous mobile apparatus according to claim 14, wherein the processor is configured to:
save odometry information during a lost period in which estimation of the apparatus location with a captured image for creating an environment map is not enabled; and
in a case in which the estimation of the apparatus location with the captured image is enabled, estimate, based on the saved odometry information, a past apparatus location relative to the apparatus location estimated with the captured image and reflect the estimated past apparatus location on the environment map.

17. An autonomous move method for an autonomous mobile apparatus, the autonomous move method comprising:
estimating, based on information from a driving unit configured to move the autonomous mobile apparatus, an apparatus location that is a location of the autonomous mobile apparatus,
estimating the apparatus location based on information from other than the driving unit;
acquiring an object location that is a location of an object that is present in a surrounding area of the autonomous mobile apparatus;
creating, based on the apparatus location estimated in the estimating based on the information from the driving unit or in the estimating based on the information from other than the driving unit and the location acquired in the object location acquisition step, an environment map including the object location, and store the created environment map in a map memory; and
using, at a time of tracking when the estimation of the apparatus location is enabled in the estimating based on information from other than the driving unit, the stored environment map that is in the map memory at a time of reference that is determined by a time of loss when the estimation of the apparatus location is not enabled.

18. An autonomous move method for an autonomous mobile apparatus, the autonomous move method comprising:
estimating an apparatus location that is a location of the autonomous mobile apparatus, while creating an environment map;
saving the environment map in a map saver or suspending update of the environment map, in a case in which estimation of the apparatus location is not enabled in the estimating of the apparatus location; and
using the saved environment map or the environment map the update of which is suspended, in a case in which the estimation of the apparatus location is enabled.

19. The autonomous mobile apparatus according to claim 1, wherein the information from the driving unit includes odometry information.

20. The autonomous mobile apparatus according to claim 1, wherein the processor is configured to use the stored environment map that is in the map memory at the time of reference that is determined by the time of loss to set a route for the driving unit to move the autonomous mobile apparatus.

* * * * *